United States Patent
Brar et al.

(10) Patent No.: US 12,086,625 B2
(45) Date of Patent: Sep. 10, 2024

(54) MULTIPLE TOP-OF-RACK (TOR) SWITCHES CONNECTED TO A NETWORK VIRTUALIZATION DEVICE

(71) Applicant: Oracle International Corporation, Redwood Shores, CA (US)

(72) Inventors: Jagwinder Singh Brar, Bellevue, WA (US); Syed Waqqas Ahmed, Bothell, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/360,660

(22) Filed: Jul. 27, 2023

(65) Prior Publication Data
US 2024/0056335 A1    Feb. 15, 2024

Related U.S. Application Data

(60) Provisional application No. 63/381,262, filed on Oct. 27, 2022, provisional application No. 63/398,134, filed on Aug. 15, 2022.

(51) Int. Cl.
*H04L 49/15*    (2022.01)
*G06F 9/455*    (2018.01)
*H04L 12/46*    (2006.01)

(52) U.S. Cl.
CPC ...... *G06F 9/45558* (2013.01); *H04L 12/4641* (2013.01); *H04L 49/15* (2013.01);
(Continued)

(58) Field of Classification Search
CPC ......... G06F 9/45558; G06F 2009/4557; G06F 2009/45595; H04L 12/4641; H04L 49/15; H04L 49/25; H04L 49/70
(Continued)

(56) References Cited

U.S. PATENT DOCUMENTS 10,218,629 B1 *  2/2019  An .................... H04L 45/22
10,797,990 B2   10/2020  Power et al.
(Continued)

FOREIGN PATENT DOCUMENTS

WO    2022146589 A1    7/2022

OTHER PUBLICATIONS

"Oracle Exadata Database Machine Operational Best Practices", Exadata Product Management, Jul. 31, 2022, 69 pages.
(Continued)

*Primary Examiner* — Karen C Tang
(74) *Attorney, Agent, or Firm* — Kilpatrick Townsend & Stockton LLP

(57) ABSTRACT

A method for providing a dedicated region cloud at customer is provided. A first physical port of a network virtualization device (NVD) included in a datacenter is communicatively coupled to a first top-of-rack (TOR) switch and a second TOR switch. A second physical port of the NVD is communicatively coupled with a network interface card (NIC) associated with a host machine. The second physical port provided a first logical port and a second logical port for communications between the NVD and the NIC. The NVD receives a packet from the host machine via the first logical port or the second logical port. Upon receiving the packet, the NVD determines a particular TOR, from a group including the first TOR and the second TOR, for communicating the packet. The NVD transmits the packet to the particular TOR to facilitate communication of the packet to a destination host machine.

20 Claims, 23 Drawing Sheets

(52) U.S. Cl.
CPC .............. *G06F 2009/4557* (2013.01); *G06F 2009/45595* (2013.01)

(58) Field of Classification Search
USPC ......................................................... 709/231
See application file for complete search history.

(56) References Cited

U.S. PATENT DOCUMENTS

| | | | |
|---|---|---|---|
| 10,812,576 B1* | 10/2020 | Yuan | H04L 49/355 |
| 11,336,570 B1* | 5/2022 | K N | H04L 45/42 |
| 11,936,570 B1* | 3/2024 | Koren | H04L 47/30 |
| 2010/0020806 A1 | 1/2010 | Vahdat et al. | |
| 2013/0329548 A1 | 12/2013 | Nakil et al. | |
| 2019/0014049 A1 | 1/2019 | Nayak et al. | |
| 2019/0104069 A1* | 4/2019 | Kommula | H04L 47/125 |
| 2020/0007440 A1* | 1/2020 | Xu | H04L 45/22 |
| 2021/0136141 A1* | 5/2021 | Tidemann | H04L 47/2483 |
| 2021/0184930 A1 | 6/2021 | Mutnuru et al. | |
| 2021/0266259 A1* | 8/2021 | Renner, III | H04L 49/70 |
| 2021/0320820 A1* | 10/2021 | Ruan | H04L 49/602 |
| 2022/0038309 A1* | 2/2022 | Boutros | H04L 45/02 |
| 2022/0206908 A1 | 6/2022 | Brar et al. | |
| 2022/0368646 A1* | 11/2022 | Vedam | H04L 47/781 |
| 2023/0380102 A1* | 11/2023 | Ahuja | H05K 7/20272 |
| 2023/0409369 A1* | 12/2023 | Liu | H04L 41/0895 |
| 2023/0412485 A1* | 12/2023 | Sommers | H04L 43/50 |
| 2024/0015051 A1* | 1/2024 | Ameling | H04L 12/5601 |
| 2024/0015140 A1* | 1/2024 | Bosch | G06F 9/54 |
| 2024/0031291 A1* | 1/2024 | Mathew | H04L 47/125 |
| 2024/0078051 A1* | 3/2024 | Shah | G06F 3/0613 |

OTHER PUBLICATIONS

PCT/US2023/029128 , "International Search Report and Written Opinion", Nov. 3, 2023, 15 pages.
PCT/US2023/029130 , "International Search Report and Written Opinion", Nov. 3, 2023, 15 pages.
PCT/US2023/029131 , "International Search Report and Written Opinion", Oct. 19, 2023, 11 pages.
PCT/US2023/029134 , "International Search Report and the Written Opinion", Oct. 16, 2023, 13 pages.

* cited by examiner

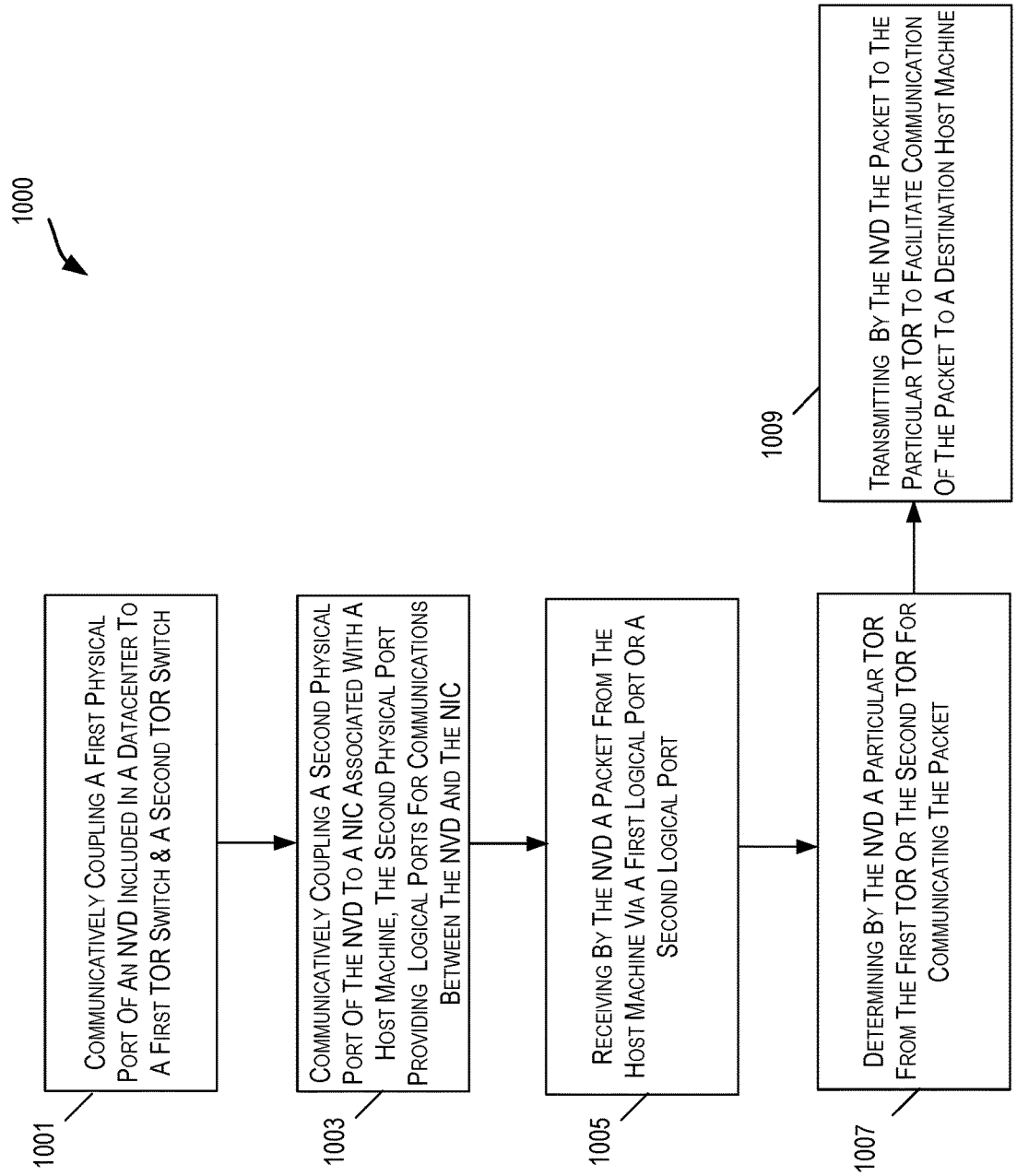

MULTIPLE TOP-OF-RACK (TOR) SWITCHES CONNECTED TO A NETWORK VIRTUALIZATION DEVICE

CROSS-REFERENCES TO RELATED APPLICATIONS

This application claims the benefit of the filing date of U.S. Provisional Application No. 63/398,134, filed on Aug. 15, 2022, and U.S. Provisional Application No. 63/381,262, filed on Oct. 27, 2022, each of which is incorporated herein by reference in its entirety.

BACKGROUND

Organizations continue to move business applications and databases to the cloud to reduce the cost of purchasing, updating, and maintaining on premise hardware and software. High performance computer applications consistently consume all of the available compute power to achieve a specific outcome or result. Such applications require dedicated network performance, fast storage, high compute capabilities, and significant amounts of memory-resources that are in short supply in the virtualized infrastructure that constitutes today's commodity clouds.

However, enterprises have typically found it costly and difficult to move to cloud infrastructure, because of the inherent mismatch between traditional application architectures and cloud architecture. For workloads that cannot move to the public cloud, these challenges are magnified. Enterprises have access to only a small subset of cloud services on-premises, and that too with a limited set of features and capabilities compared to what is available in the public cloud.

Accordingly, a framework is desired that brings the full capabilities of the public cloud on-premises, so that enterprises can reduce infrastructure and operational costs, upgrade legacy applications on modern cloud services, and meet the most demanding regulatory, data residency, and latency requirements—all with the infrastructure of the cloud service provider, which offers enhanced performance and highest levels of security. Embodiments discussed herein address these and other issues.

SUMMARY

The present disclosure relates generally to cloud networks. More particularly, the present disclosure relates to a Dedicated Region Cloud at Customer (DRCC) that corresponds to an infrastructure of a cloud service provider (CSP) that is deployed in a customer's own datacenter. With DRCC, enterprises can easily consolidate mission-critical database systems, with applications that were previously deployed on expensive hardware on the highly available and secure infrastructure of the CSP, thereby creating operational efficiencies and modernization opportunities.

The DRCC framework brings the full capabilities of the public cloud on-premises, so that enterprises can reduce infrastructure and operational costs, upgrade legacy applications on modern cloud services, and meet the most demanding regulatory, data residency, and latency requirements—all with the infrastructure of the CSP, which offers enhanced performance and highest levels of security. Customers get the choice and flexibility to run all the cloud services of the CSP in their data centers. Customers can choose from all public cloud services provided by the CSP, for example, including VMware Cloud, Autonomous Database, Container Engine for Kubernetes, Bare Metal Servers, Exadata Cloud Service, and only pay for services they consume. The DRCC framework is designed to keep data and customer operations completely isolated from the internet—where the control plane and data plane operations remain on-premises—to help customers meet their most demanding compliance and latency requirements. With a fully managed experience and access to new capabilities the moment they become available in the public cloud, the DRCC framework offers cloud-scale security, resiliency and scale, and support for mission-critical workloads with the tools to incrementally modernize legacy workloads.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

An aspect of the present disclosure provides for a method comprising: communicatively coupling a first physical port of a network virtualization device (NVD) included in a datacenter to a first top-of-rack (TOR) switch and a second TOR switch; communicatively coupling a second physical port of the NVD with a network interface card (NIC) associated with a host machine, the second physical port providing a first logical port and a second logical port for communications between the NVD and the NIC; receiving, by the NVD, a packet from the host machine via the first logical port or the second logical port; determining, by the NVD, a particular TOR, from a group including the first TOR and the second TOR, for communicating the packet; and transmitting, by the NVD, the packet to the particular TOR to facilitate communication of the packet to a destination host machine.

Another aspect of the present disclosure provides for a computing device a processor; and a memory including instructions that, when executed with the processor, cause the computing device to, at least: communicatively couple a first physical port of a network virtualization device (NVD) included in a datacenter to a first top-of-rack (TOR) switch and a second TOR switch; communicatively couple a second physical port of the NVD with a network interface card (NIC) associated with a host machine, the second physical port providing a first logical port and a second logical port for communications between the NVD and the NIC; receive, by the NVD, a packet from the host machine via the first logical port or the second logical port; determine, by the NVD, a particular TOR, from a group including the first TOR and the second TOR, for communicating the packet; and transmit, by the NVD, the packet to the particular TOR to facilitate communication of the packet to a destination host machine.

Another aspect of the present disclosure provides for a non-transitory computer readable medium storing specific computer-executable instructions that, when executed by a processor, cause a computer system to perform operations comprising: communicatively coupling a first physical port of a network virtualization device (NVD) included in a datacenter to a first top-of-rack (TOR) switch and a second TOR switch; communicatively coupling a second physical port of the NVD with a network interface card (NIC) associated with a host machine, the second physical port providing a first logical port and a second logical port for communications between the NVD and the NIC; receiving, by the NVD, a packet from the host machine via the first logical port or the second logical port; determining, by the NVD, a particular TOR, from a group including the first TOR and the second TOR, for communicating the packet; and transmitting, by the NVD, the packet to the particular TOR to facilitate communication of the packet to a destination host machine.

BRIEF DESCRIPTION OF THE DRAWINGS

Features, embodiments, and advantages of the present disclosure are better understood when the following Detailed Description is read with reference to the accompanying drawings.

FIG. 10 depicts a flowchart illustrating a process of providing a DRCC to a customer on-premise location according to some embodiments.

DETAILED DESCRIPTION

Figure 1:
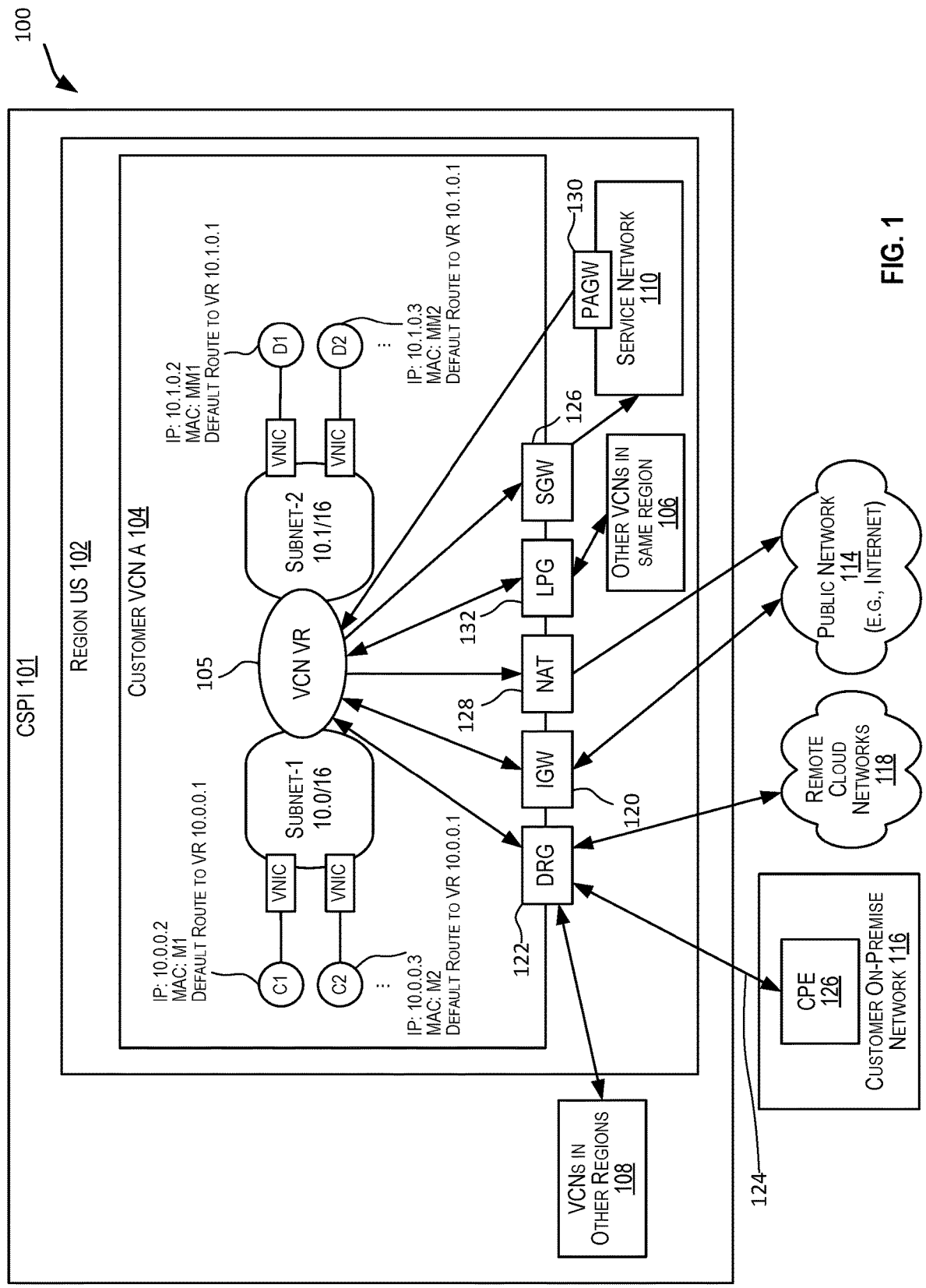
FIG. 1 is a high-level diagram of a distributed environment showing a virtual or overlay cloud network hosted by a cloud service provider infrastructure according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Example Architecture of Cloud Infrastructure

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The virtual or overlay networks can include one or more virtual cloud networks (VCNs). The virtual networks are implemented using software virtualization technologies (e.g., hypervisors, functions performed by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual networks. Both the physical IP addresses and overlay IP addresses are types of real IP addresses. These are separate from virtual IP addresses, where a virtual IP address maps to multiple real IP addresses. A virtual IP address provides a 1-to-many mapping between the virtual IP address and multiple real IP addresses.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in a virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with public accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC) that enables the compute instance to participate in a subnet of a VCN. A VNIC is a logical representation of physical Network Interface Card (NIC). In general, a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 18, 19, 20, and 21 (see references 1816, 1916, 2016, and 2116) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, 18, 19, 20, and 21 are described below. FIG. 1 is a high level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN 104 for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has a private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has a private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 18, 19, 20, and 21 (for example, gateways referenced by reference numbers 1834, 1836, 1838, 1934, 1936, 1938, 2034, 2036, 2038, 2134, 2136, and 2138) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the another endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud-based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's Fast-Connect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 1120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
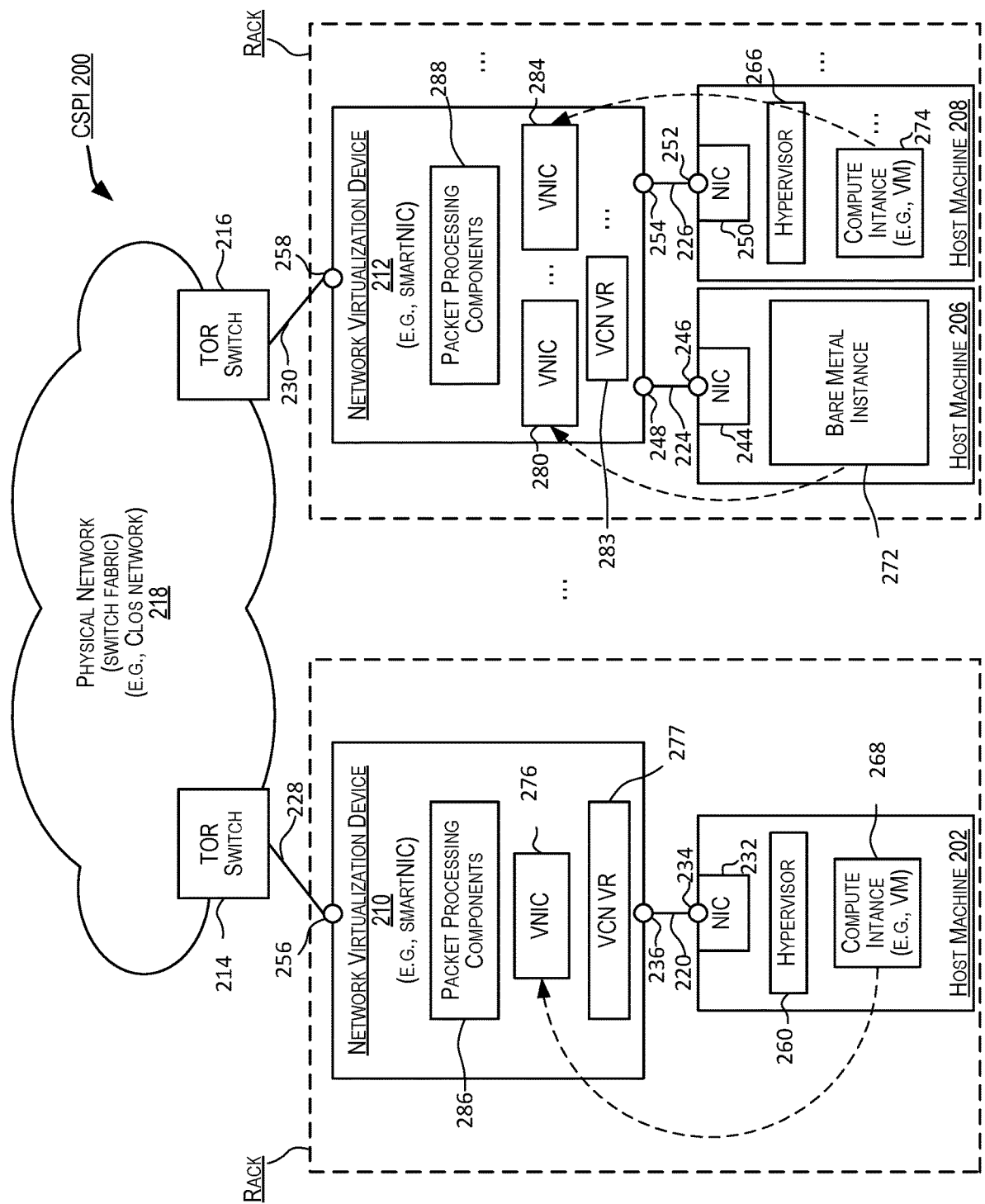
FIG. 2 depicts a simplified architectural diagram of the physical components in the physical network within CSPI according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric).

In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
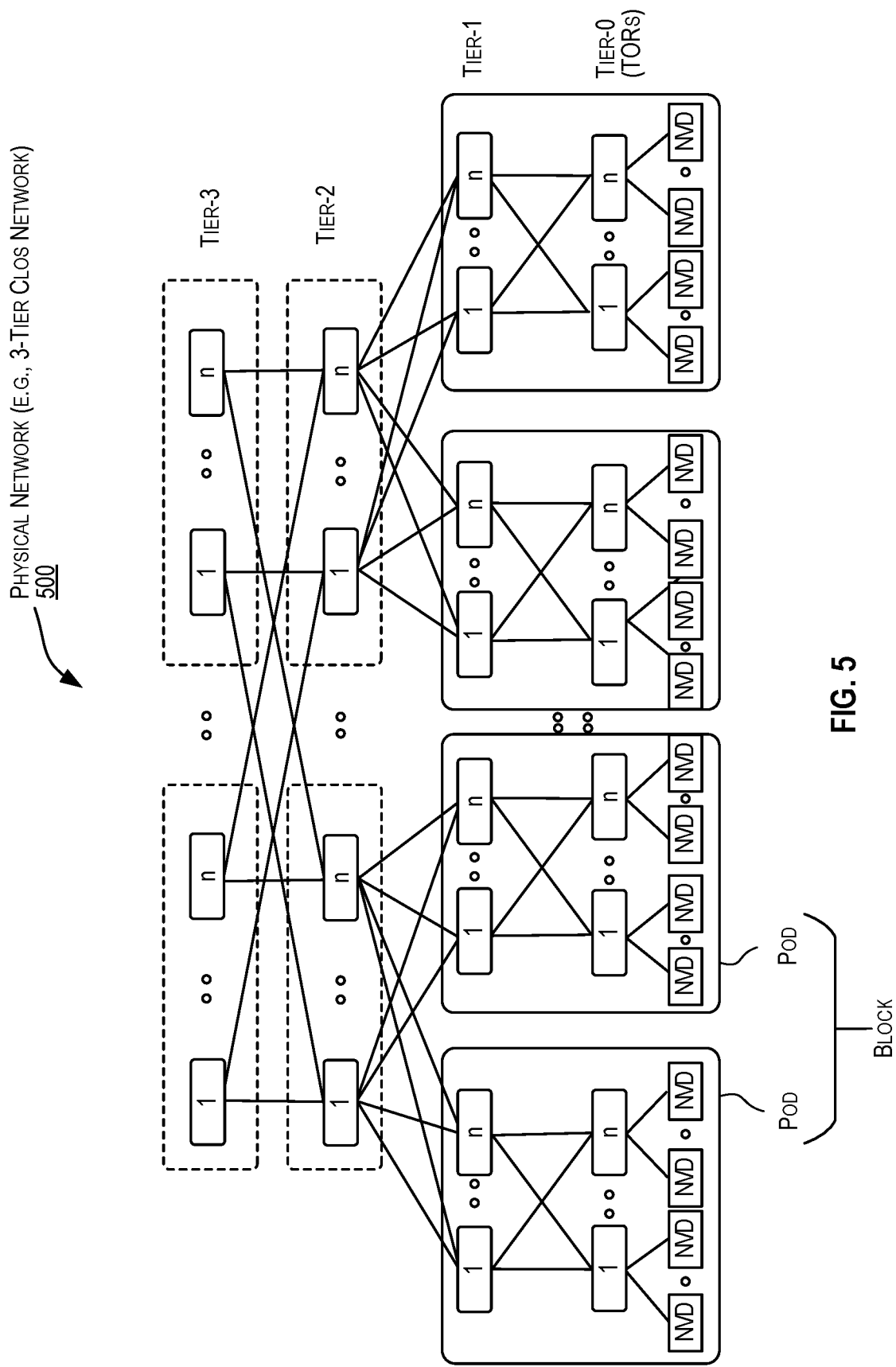
FIG. 5 depicts a simplified block diagram of a physical network provided by a CSPI according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
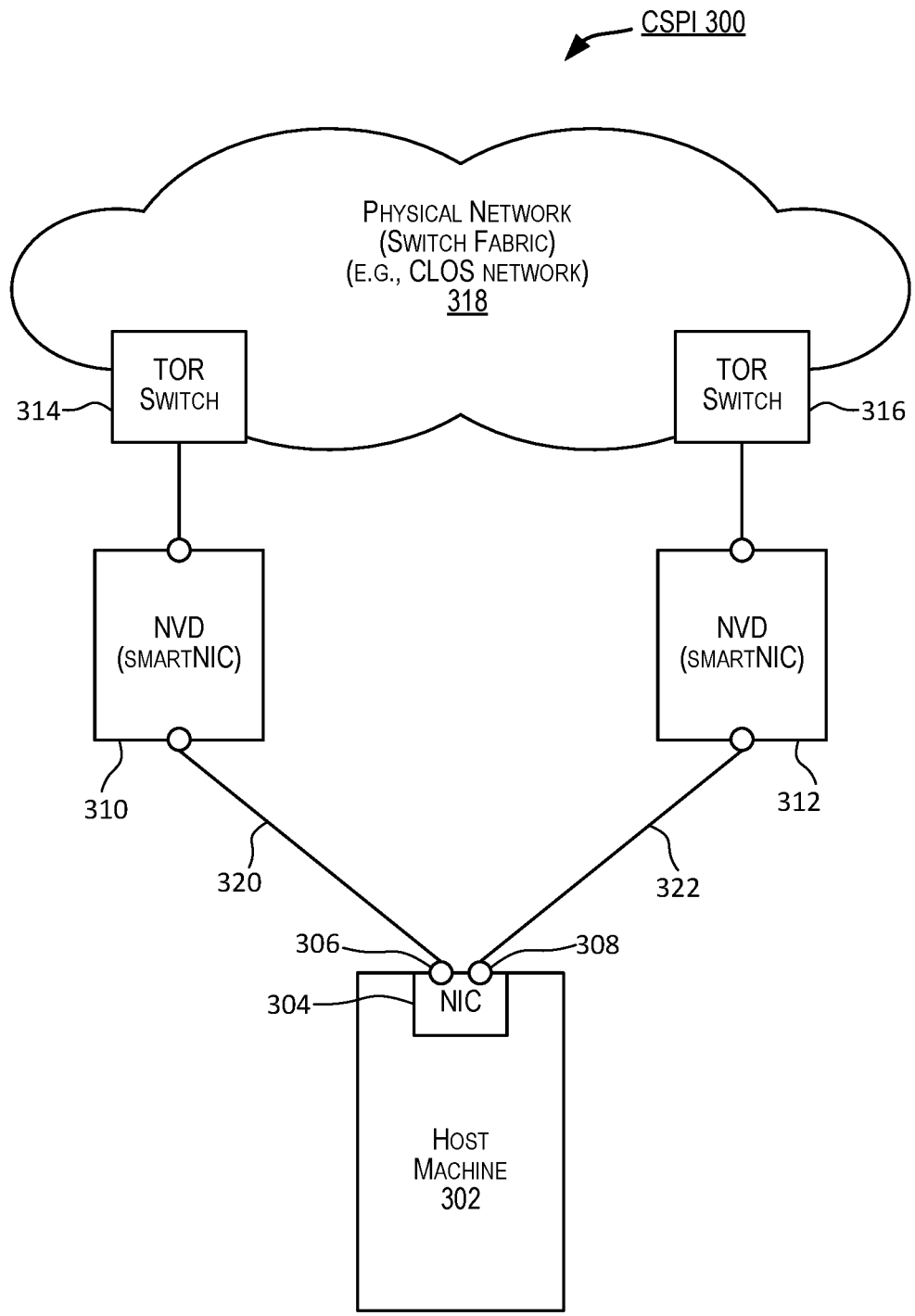
FIG. 3 shows an example arrangement within CSPI where a host machine is connected to multiple network virtualization devices (NVDs) according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320, and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with cis in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 18, 19, 20, and 21 (see references 1816, 1916, 2016, and 2116) and described below. Examples of a VCN Data Plane are depicted in FIGS. 18, 19, 20, and 21 (see references 1818, 1918, 2018, and 2118) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206, and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200, or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet)

(not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
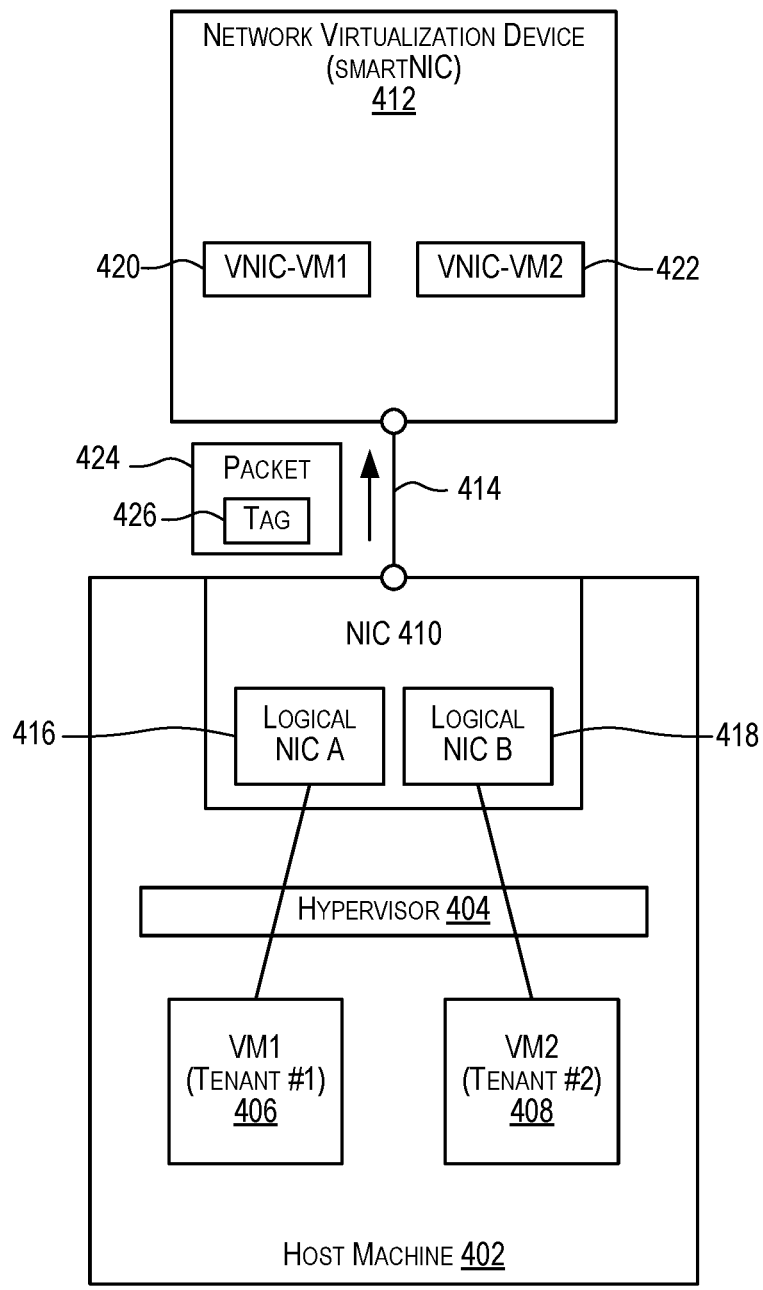
FIG. 4 depicts connectivity between a host machine and an NVD for providing I/O virtualization for supporting multitenancy according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multi-tenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>.[REGION][.FUTURE USE].<UNIQUE ID> where, ocid1: The literal string indicating the version of the CID; resource type: The type of resource (for example, instance, volume, VCN, subnet, user, group, and so on); realm: The realm the resource is in. Example values are "c1" for the commercial realm, "c2" for the Government Cloud realm, or "c3" for the Federal Government Cloud realm, etc. Each realm may have its own domain name; region: The region the resource is in. If the region is not applicable to the resource, this part might be blank; future use: Reserved for future use. unique ID: The unique portion of the ID. The format may vary depending on the type of resource or service.

Dedicated Region Cloud at Customer (DRCC)

Dedicated Region Cloud at Customer (DRCC) corresponds to an infrastructure of a cloud service provider (CSP) that is deployed in a customer's own datacenter. With DRCC, enterprises can easily consolidate mission-critical database systems, with applications that were previously deployed on expensive hardware on the highly available and secure infrastructure of the CSP, thereby creating operational efficiencies and modernization opportunities. Enterprises have typically found it costly and difficult to move to cloud infrastructure, because of the inherent mismatch between traditional application architectures and cloud architecture. For workloads that can't move to the public cloud, these challenges are magnified. Enterprises have access to only a small subset of cloud services on-premises, and that too with a limited set of features and capabilities compared to what's available in the public cloud.

The DRCC framework brings the full capabilities of the public cloud on-premises, so that enterprises can reduce infrastructure and operational costs, upgrade legacy applications on modern cloud services, and meet the most demanding regulatory, data residency, and latency requirements—all with the infrastructure of the CSP, which offers enhanced performance and highest levels of security. Customers get the choice and flexibility to run all the cloud services of the CSP in their data centers. Customers can choose from all public cloud services provided by the CSP, for example, including VMware Cloud, Autonomous Database, Container Engine for Kubernetes, Bare Metal Servers, Exadata Cloud Service, and only pay for services they consume. The DRCC framework is designed to keep data and customer operations completely isolated from the internet—where the control plane and data plane operations remain on-premises—to help customers meet their most demanding compliance and latency requirements. With a fully managed experience and access to new capabilities the moment they become available in the public cloud, the DRCC framework offers cloud-scale security, resiliency and scale, and support for mission-critical workloads with the tools to incrementally modernize legacy workloads.

Some benefits incurred by the DRCC are as follows:
   Bringing all public cloud services and autonomous databases on-premises to reduce the risk and cost of innovation
   Providing a framework where customers pay only for the services consumed
   Building a truly consistent development experience for all IaaS and PaaS applications by using the exact same tools, APIs, and SLAs available in the public cloud infrastructure
   Retaining full control of all data to meet the most demanding data privacy and latency requirement
   Deploying seamlessly between on-premises and public cloud without any compromises on functionality or development experience
   Consolidating workloads on a single cloud platform, so that customers can focus on business priorities
   Reducing the costs of running on-premises workloads with CSP's infrastructure providing highest levels of security Infrastructure of a CSP is typically hosted in regions and availability domains. A region is a localized geographic area, and an availability domain is one or more data centers located within the region. A region is thus composed of one or more availability domains. Most infrastructure resources are either region-specific, such as a virtual cloud network, or availability domain-specific, such as a compute instance. Traffic between availability domains and between regions is encrypted. Availability domains are isolated from each other, fault tolerant, and very unlikely to fail simultaneously. Because availability domains do not share infrastructure such as power or cooling, or the internal availability domain network, a failure at one availability domain within a region is unlikely to impact the availability of the others within the same region.

The availability domains within the same region are connected to each other by a low latency, high bandwidth network, which makes it possible to provide high-availability connectivity to the internet and on-premises, and to build replicated systems in multiple availability domains for both high-availability and disaster recovery. Regions are independent of other regions and can be separated by vast distances-across countries or even continents. Generally, one may deploy an application in the region where it is most heavily used, because using nearby resources is faster than using distant resources. However, one may also deploy applications in different regions in order to mitigate risks of region-wide events such as earthquakes.

A fault domain is a grouping of hardware and infrastructure within an availability domain. Each availability domain contains multiple fault domains (e.g., three fault domains). Fault domains provide anti-affinity i.e., fault domains let you distribute instances so that the instances are not on the same physical hardware within a single availability domain. A hardware failure or compute hardware maintenance event that affects one fault domain does not affect instances in other fault domains. In addition, the physical hardware in a fault domain has independent and redundant power supplies, which prevents a failure in the power supply hardware within one fault domain from affecting other fault domains.

According to some embodiments, in the context of a DRCC, an availability domain is provided via a rack including a plurality of top-of-rack (TOR) switches and a plurality of host machines/servers. A TOR switch is a network switch used in data centers to connect servers and other network devices in the rack. The purpose of a TOR switch is to provide high-speed connectivity and efficient data transfer between the devices within the rack and the larger network infrastructure. A TOR switch typically has a high port density to accommodate multiple servers and devices within a single rack. It provides Ethernet connectivity for these devices, allowing them to communicate with each other and with the rest of the network. TOR switches often support high-speed Ethernet standards, such as 10 Gigabit Ethernet, 25 Gigabit Ethernet, 40 Gigabit Ethernet, or 100 Gigabit Ethernet. These fast data transfer rates ensure efficient communication between the servers and the network. TOR switches provide minimal latency and provide low latency switching, which is crucial in data centers where fast response times are required for applications and services running on the servers. In what follows, there is described with reference to FIGS. 6 and 7, different TOR configurations that may be employed within a rack in a datacenter.

Figure 6:
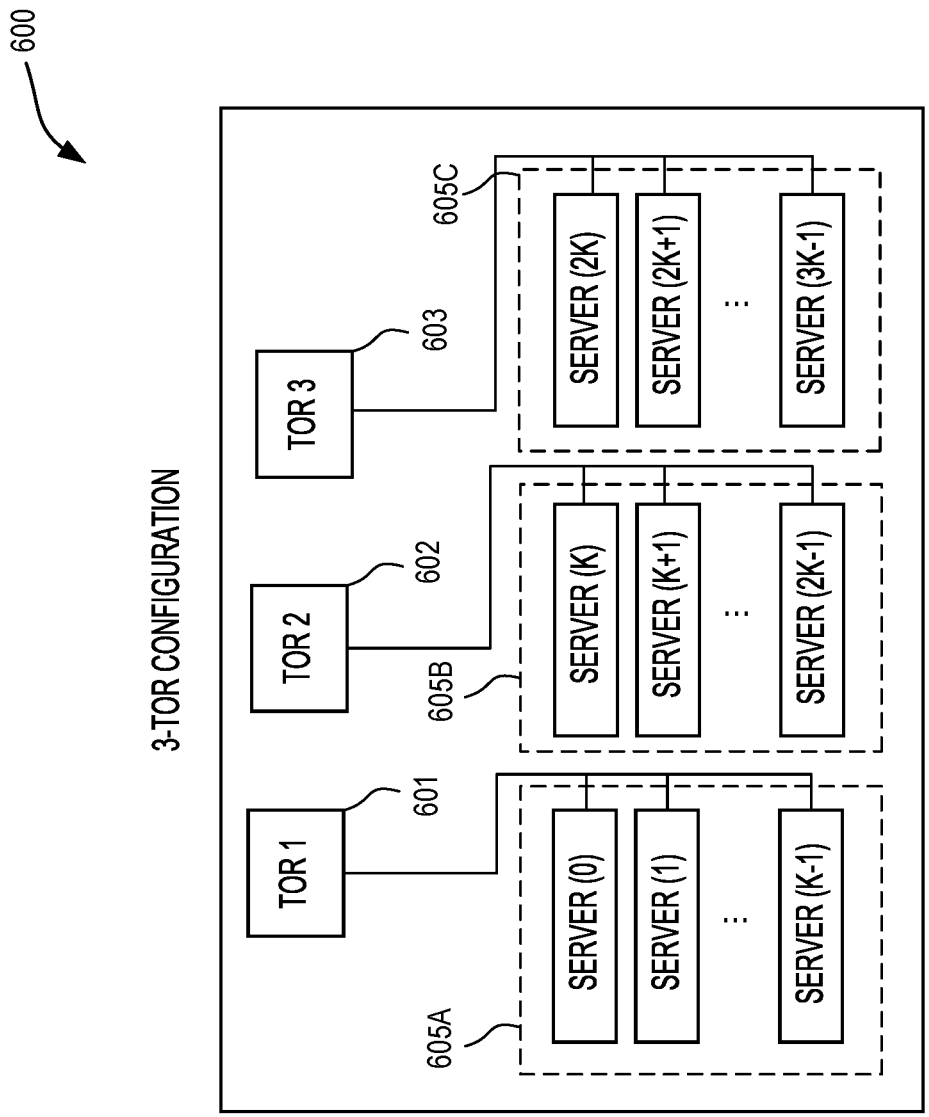
FIG. 6 depicts a configuration of a plurality of TORs included in a rack, according to at least one embodiment.

FIG. 6 depicts a configuration of a plurality of TORs included in a rack, according to at least one embodiment. The configuration 600 of a plurality of TORs depicted in FIG. 6 corresponds to a 3-TOR configuration. A rack includes the three TORs (601, 602, and 603), and a plurality of host machines/servers. In one implementation, a fault domain is created within the availability domain (i.e., the rack) by selecting a subset of host machines from the plurality of host machines. Each host machine in the group of selected host machines (i.e., the subset of host machines) is communicatively coupled to one of the TORs included in the plurality of TORs. For instance, as shown in FIG. 6, a first subset of host machines from the plurality of host machines is depicted as 605A. Each host machine/server included in 605A is communicatively coupled to a first TOR i.e., TOR 1, 601. Thus, the combination of the first subset of host machines (605A) and the first TOR (601) form a first fault domain.

A second fault domain is created within the availability domain by selecting a second subset of host machines from the plurality of host machines. Each host machine in the second subset of host machines is communicatively coupled to another TORs (i.e., different from TOR associated with the first fault domain) included in the plurality of TORs. It is noted that the first subset of host machines is disjoint from the second subset of host machines. For example, as shown in FIG. 6, a second subset of host machines from the plurality of host machines is depicted as 605B. Each host machine/server included in 605B is communicatively coupled to a second TOR i.e., TOR 2, 602.

In a similar fashion, a third fault domain may be created within the availability domain by selecting a third subset of host machines from the plurality of host machines. Each host machine in the third subset of host machines is communicatively coupled to another TORs (i.e., different from TORs associated with the first fault domain and the second fault domain). It is noted that the third subset of host machines is disjoint from the first subset of host machines as well as the second subset of host machines. For example, as shown in FIG. 6, the third subset of host machines from the plurality of host machines is depicted as 605C. Each host machine/server included in 605C is communicatively coupled to a third TOR i.e., TOR 3, 603 to form the third fault domain.

Each of the first, second, and third subset of servers (605A, 605B, and 605C) is depicted in FIG. 6 to include K servers. It is appreciated that this is in no way limiting the scope of the present disclosure. A particular subset of servers may have a different number of servers included in it as compared to another subset of servers. Further, the rack includes a plurality of network virtualization devices (NVDs). A first subset of NVDs from the plurality of NVDs is employed to connect the first subset of servers/host machines to the first TOR. In a similar manner, a second subset of NVDs from the plurality of NVDs is employed to connect the second subset of servers/host machines to the second TOR, and a third subset of NVDs is employed to connect the third subset of servers/host machines to the third TOR.

Further, for each fault domain (i.e., combination of a subset of servers and a TOR switch associated with the subset of servers), a set of addresses corresponding to host machines/servers included in the first subset of host machines/servers are associated with the TOR switch associated with the first subset of servers. In this manner, a control plane is configured to forward a packet destined for a particular server included in a first subset of servers to the first TOR that is associated with the first subset of servers.

Thus, the configuration of the rack as depicted in FIG. 6 provides for three distinct fault domains, which provide a blast radius (i.e., percentage of capacity loss upon a TOR switch being failed) that is smaller than the case of having all servers within a rack being communicatively coupled to a single TOR switch. Specifically, the configuration of the rack as depicted in FIG. 6 incurs a blast radius of 33% i.e., we have a 33% capacity loss upon the failure of a single TOR. It is noted however that the probability of having multiple TORs fail at the same time within a rack is very low i.e., negligible. In one implementation, the rack configuration of FIG. 6 provides one or more fault domains that may be presented to a customer. Upon obtaining a request from the customer requesting allocation of one or more host machines in the rack, the control plane may assign the one or more host machines included in the one or more fault domains based on certain criterion. For example, if high availability is requested by the customer, the control plane may allocate host machines that are in different fault domains.

Figure 7:
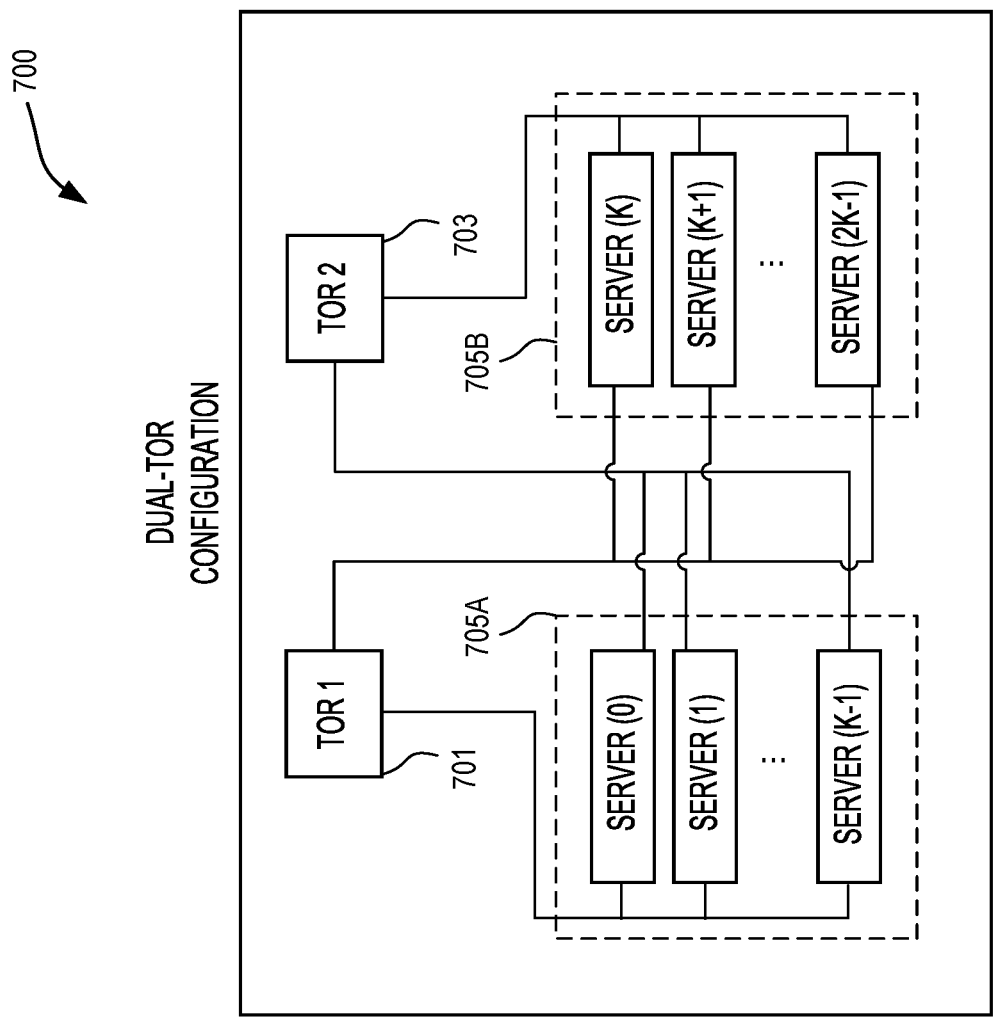
FIG. 7 depicts another configuration of a plurality of TORs included in a rack, according to some embodiments.

Turning to FIG. 7, there is depicted another configuration of a plurality of TORs included in a rack, according to some embodiments. Specifically, the configuration 700 depicted in FIG. 7 is referred to herein as a dual-TOR configuration. As shown in FIG. 7, the rack includes two TORs i.e., TOR 1 701, and TOR 2 703. Further, the rack includes a plurality of servers/host machines. According to some embodiments, the plurality of servers are grouped into disjoint subsets of servers. For example, the plurality of servers may be grouped into a first subset of servers 705A and a second subset of servers 705B.

As shown in FIG. 7, in the dual-TOR configuration, each subset of servers is communicatively coupled to each of TOR included in the rack. Specifically, the first subset of servers 705A and the second subset of servers is communicatively coupled to TOR 1 701, and TOR 2 703. Thus, in this configuration, upon the failure of a single TOR switch in the rack, no loss of capacity is incurred, and the servers simply select the other functioning TOR for communicating data. It is noted that the probability of having both TORs fail at the same time within a rack is extremely low i.e., almost negligible. In contrast to the TOR configuration of FIG. 6, where there were no changes in the design of the NVD that couples a server to a TOR (i.e., each NVD coupled a single server to a single TOR), in the configuration of FIG. 7, it is appreciated that a NVD is configured to be connected to both TORs. Thus, in this configuration, each NVD is configured to have multiple IP addresses. It is appreciated that in the configuration of FIG. 7, the entire rack, which includes multiple TORs (i.e., providing redundancy) is considered to be a fault domain. In some implementations, a fault domain can span across multiple racks. For instance, consider a switch serving multiple racks (e.g., four racks). In this situation, the four racks could be considered as a fault domain, where each may comprise multiple TORs to provide redundancy.

Figure 8:
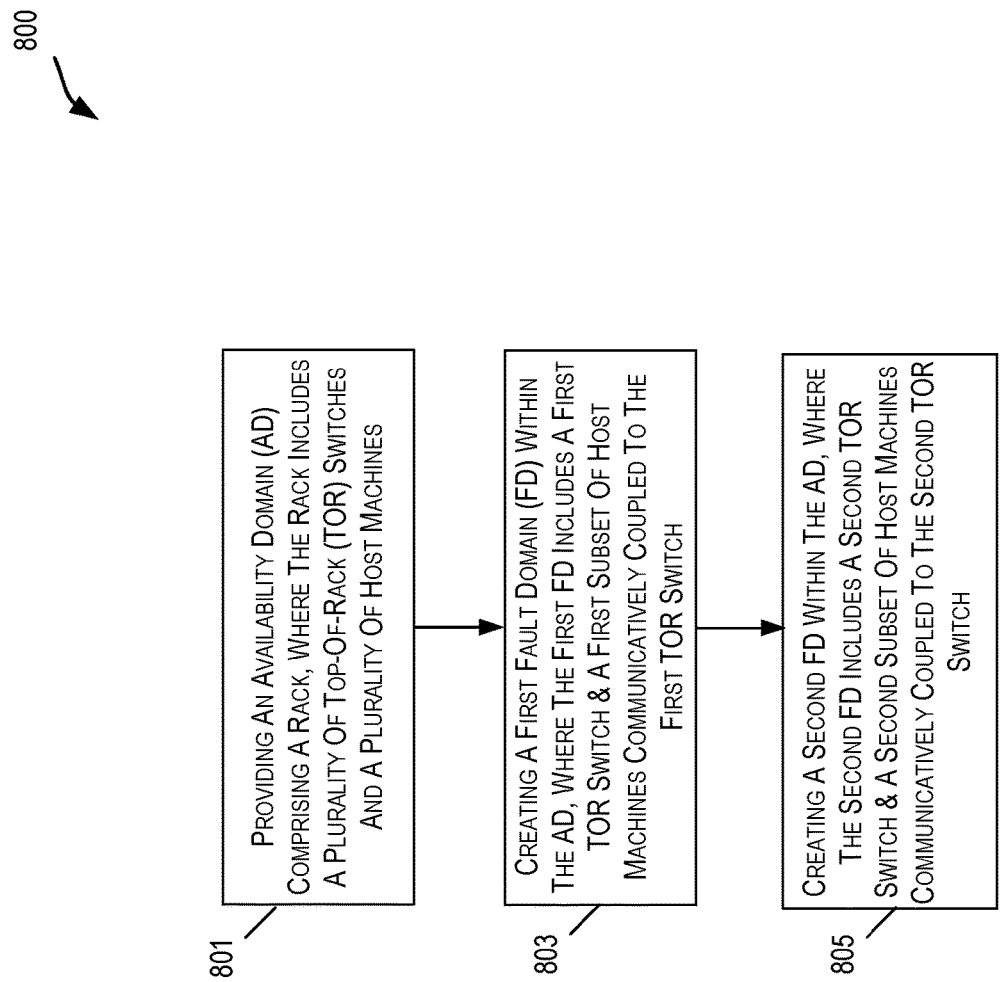
FIG. 8 depicts a flowchart illustrating steps performed in providing an availability domain to a customer according to at least one embodiment.

FIG. 8 depicts a flowchart illustrating steps performed in providing an availability domain to a customer according to at least one embodiment. The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 8 and described below is intended to be illustrative and non-limiting. Although FIG. 8 depicts the various processing steps occurring in a particular sequence or order, this is not intended to be limiting. In certain alternative embodiments, the steps may be performed in some different order or some steps may also be performed in parallel.

The process commences in step 801, where a control plane provides an availability domain comprising a rack. The rack includes a plurality of TOR switches and a plurality of host machines or servers. In step 803, a first fault domain is created within the availability domain. The first fault domain comprises a first TOR switch from the plurality of TOR switches and a first subset of host machines from the plurality of host machines. The first subset of host machines are communicatively coupled to the first TOR. The process thereafter moves to step 805, where a second fault domain is created within the availability domain. The second fault domain comprises a second TOR switch from the plurality of TOR switches and a second subset of host machines from the plurality of host machines. It is noted that the second subset of host machines is disjoint from the first set of host machines. The second subset of host machines are further communicatively coupled via NVDs to the second TOR. In this manner, one or more fault domains may be presented to a customer. Upon obtaining a request from the customer requesting allocation of one or more host machines in the rack, the control plane may assign the one or more host machines included in the one or more fault domains based on certain criterion associated with the customer requirements.

Figure 9:
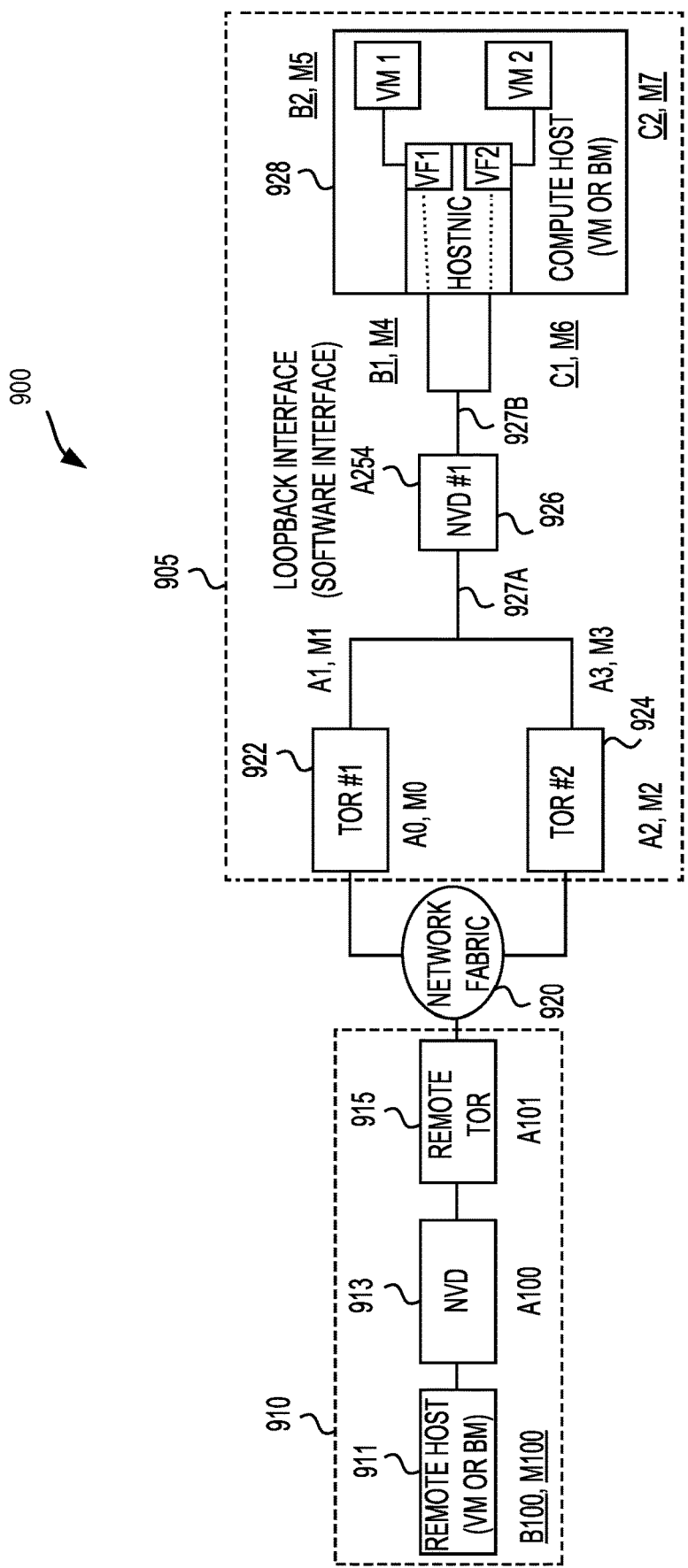
FIG. 9 depicts an exemplary infrastructure of a DRCC according to some embodiments.

Turning now to FIG. 9, there is depicted an exemplary architecture 900 of a DRCC framework that brings to customers, the full capabilities of a public cloud. As such, customers can reduce infrastructure and operational costs, upgrade legacy applications on modern cloud services, and meet the most demanding regulatory, data residency, and latency requirements.

According to some embodiments, FIG. 9 depicts a datacenter 905 that includes a pair of TORs i.e., TOR #1 922 and TOR #2 924, a network virtualization platform e.g., NVD 926, and a compute host 928 (also referred to herein as a local compute host). It is appreciated that the compute host 928 includes a plurality of virtual machines or bare metal instances. The NVD 926 is referred to herein as a local NVD. The compute host 928 includes a host network interface card (i.e., host NIC). For sake of illustration, FIG. 9 depicts the compute host 928 as comprising two virtual machines i.e., VM1 and VM2, respectively. It is noted that each of the VMs is communicatively coupled to the host NIC via one of the logical interfaces (e.g., logical interfaces depicted as PF1 and PF2, respectively). Furthermore, it is noted that the local NVD 926 may be disposed on the same chassis as the host NIC included in the compute host 928.

The compute host 928 included in the datacenter may be coupled to another host machine 911 that is referred to herein as a remote host machine. It is appreciated that the remote host machine can be 'any' host machine such as: (i) another host inside the DRCC and which is located behind another NVD, or (ii) another host in another DRCC (e.g., in a group of DRCCs meant for the same customer/organization) and located behind another NVD (e.g., in a group of DRCCs meant for the same customer/organization), or (iii) a host machine included in a customer's on-premise network. It is noted that in the case of having the host machine included in the customer's on-premise network, the host machine may connect to the DRCC via a Fast-Connect or IPSec VPN tunnel and use a dynamic routing gateway (DRG) to connect to a host machine in the DRCC. For sake of illustration, in the following description, it is assumed that the remote host machine (e.g., host machine 911) is one which is included in the DRCC and located behind another NVD (e.g., NVD 913 and served by a remote TOR 915). However, it is noted that the features described below are equally applicable to the other cases of the remote host machines outlined above. Moreover, it is appreciated that in this case (and as shown in FIG. 9), the two host machines (i.e., local host machine 928 and remote host machine 911 may be coupled via a network fabric 920). Further, for sake of convenience, the NVD 913 is referred to herein as a remote NVD.

According to some embodiments, the local NVD 926 has multiple physical ports. For instance, in one implementation as shown in FIG. 9, the local NVD 926 has two physical ports—a first physical port 927A (referred to herein as a TOR facing port) that is connected to the TORs 922 and 924 respectively, and a second physical port 927B (referred to herein as a host facing port) that is connected to the compute host 928. Each physical port of the local NVD 926 may be divided into multiple logical ports. For instance, as shown in FIG. 9, the physical port 927B is divided into two logical ports on the host facing side, and the physical port 927A is divided into two logical ports on the TORs facing side.

Dividing each of the physical ports of the local NVD 926, provides for each of the physical ports of the NVD 926 the flexibility to be represented by two logical ports, two MAC addresses, and two IP addresses. For example, in FIG. 9, overlay IP addresses and overlay MAC addresses are denoted by an underlined symbol (e.g., B1, M1), whereas substrate IP and MAC addresses are denoted without the underline symbol (e.g., A0, M0). As shown in FIG. 9, the first physical port 927A of the local NVD 926 is associated with a first IP address (A1), a second IP address (A3), a first MAC address (M1), and a second MAC address (M3). The second physical port 927B of the local NVD 926 is associated with a first overlay IP address (B1), a second overlay IP address (C1), a first overlay MAC address (M4), and a second overlay MAC address (M6).

It is appreciated that a limit on the number of logical ports that can be obtained by dividing the physical port (e.g., port 927A) of the NVD 926 is dependent on a width of a serializer/de-serializer component (i.e., SerDes component) that is included in the NVD chipset. In one instance, each physical port of the NVD 926 may be bifurcated into four logical ports. It is appreciated that a higher number of logical ports may be obtained for each physical port of the NVD 926 via the utilization of a gearbox component in the NVD. The datacenter 905 (i.e., DRCC) brings the full capabilities of the public cloud to customers. Specifically, the DRCC hosts applications and data that require strict data residency, control, and security, and provide a means for data to remain in specific locations for low-latency connectivity and data-intensive processing. Accordingly, customers can avail all cloud services running directly in their own data centers, as opposed to a cloud region that is hundreds or thousands of miles away. Thus, the DRCC with a smaller footprint (described later with reference to FIG. 14) provides organizations an opportunity to run workloads outside the public cloud.

Turning to FIG. 10, there is depicted a flowchart illustrating a process of providing a DRCC according to some embodiments. The processing depicted in FIG. 10 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 10 and described below is intended to be illustrative and non-limiting. Although FIG. 10 depicts the various processing steps occurring in a particular sequence or order, this is not intended to be limiting. In certain alternative embodiments, the steps may be performed in some different order or some steps may also be performed in parallel. In some implementations, the method illustrated in FIG. 10 may be performed by a cloud service provider to provide DRCC to a customer.

The method commences in step 1001, where a first physical port of a network virtualization device (NVD) that is included in a datacenter is communicatively coupled to a first top-of-rack (TOR) switch and a second TOR switch. It is noted that the first and second TOR switches may be included in a rack (as shown in FIGS. 6 and 7). In step 1003, a second physical port of the NVD is communicatively coupled with a network interface card (NIC) associated with a host machine included in the datacenter. The second physical port provides a first logical port and a second logical port for communications between the NVD and the NIC.

The process then moves to step 1005, where the NVD receives a packet from the host machine via the first logical port or the second logical port. In step 1007, the NVD determines a particular TOR from a group including the first TOR and the second TOR, for communicating the packet. According to some embodiments, the NVD may execute a packet forwarding mechanism such as an equal cost multipath routing (ECMP) flow hashing to select one of the two TORs. Further, in step 1009, the NVD transmits the packet to the particular TOR in order to facilitate communication of the packet to a destination host machine e.g., host machines behind other NVDs in the same rack, or other host machine(s) behind other NVDs in other racks or a host machine outside the datacenter e.g., included in the customer on-premises network.

In what follows, there is provided a detailed description of: (i) transmission of a packet from a compute host (e.g., compute host 928) included in the datacenter 905 to a remote host 911 with reference to FIG. 11A; and (ii) transmission of a packet from the remote host to the compute host in the data center i.e., return path, with reference to FIG. 11B. As stated previously, overlay IP addresses, and overlay MAC addresses are denoted by an underlined symbol (e.g., B1, M1), whereas substrate IP and MAC addresses are denoted without the underline symbol (e.g., A0, M0). For sake of illustration, we consider the case of a virtual machine (e.g., VM1) included in the compute host 928 that sends a packet to a remote host 911. The steps included in the transmission of the packet are described below with reference to FIG. 11A.

Figure 11A:
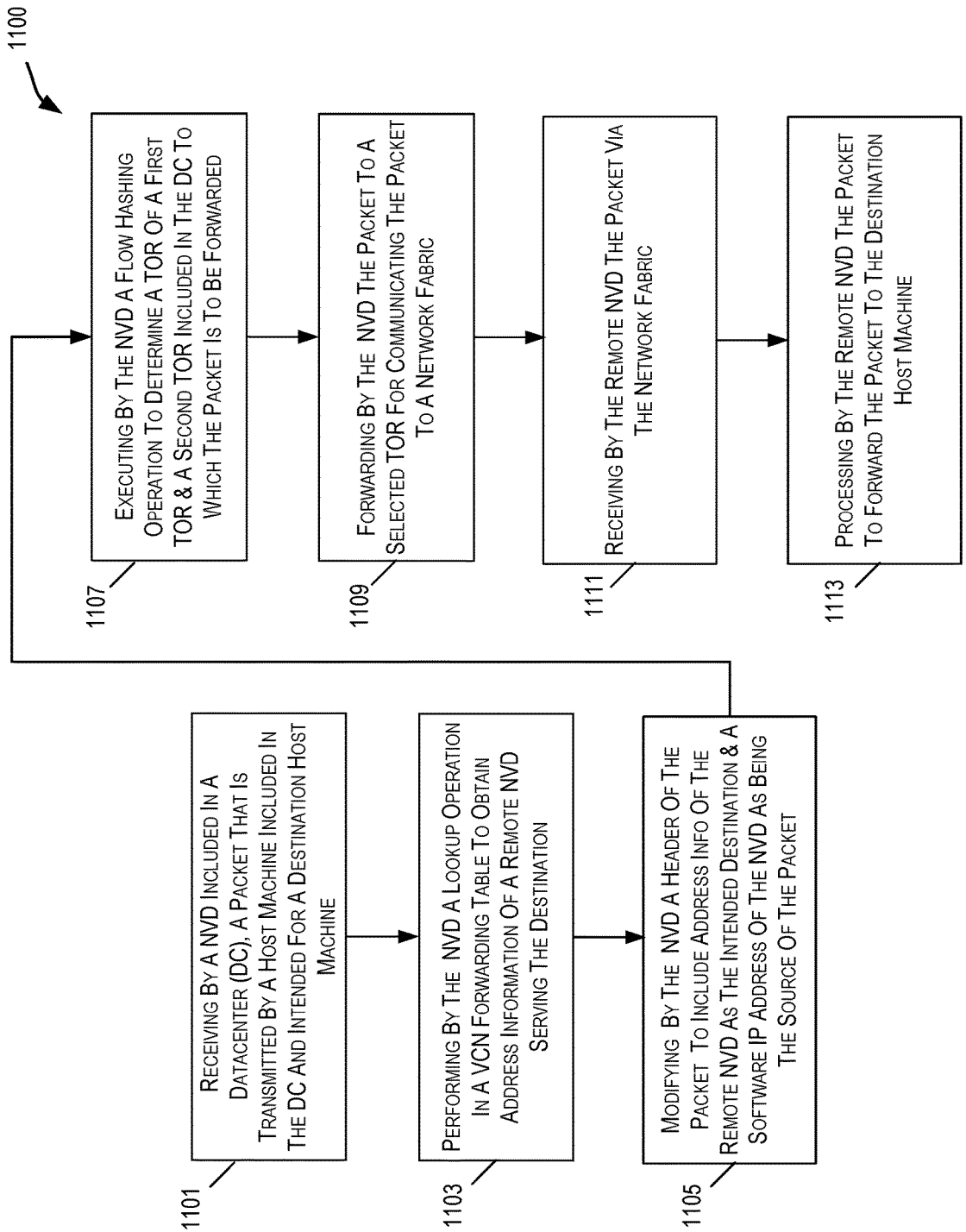
FIG. 11A depicts a flowchart illustrating steps performed in transmission of a packet from a compute host included in the datacenter to a remote host outside the datacenter, according to some embodiments.

FIG. 11A depicts a flowchart illustrating steps performed in transmission of a packet from a compute host included in the datacenter to a remote host. For sake of illustration, the description provided with reference to FIG. 11 A and FIG. 11B pertains to a host in a DRCC transmitting/receiving a packet from another host in the DRCC. However, it is appreciated that the features described herein are equally applicable to other cases of remote hosts e.g., remote host machines included in a customer's on-premise network. The processing depicted in FIG. 11A may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 11A and described below is intended to be illustrative and non-limiting. Although FIG. 11A depicts the various processing steps occurring in a particular sequence or order, this is not intended to be limiting. In certain alternative embodiments, the steps may be performed in some different order or some steps may also be performed in parallel.

In step 1101, VM1 having an overlay IP address of B2 transmits the packet (intended for remote host 911 having an overlay IP address of B100) that is received by the NVD 926 having address B1, M4 (i.e., overlay IP and MAC address of one of the logical ports of the NVD). It is noted that VM1 transmits the packet to the host NIC via the logical interface PF 1. In turn, the host NIC utilizes one of the two logical ports of the NVD 926 to transmit the packet. According to some embodiments, it is noted that each virtual machine of the compute host is associated with a logical interface on the host NIC. These interfaces are referred to herein as virtual functions i.e., "VFs", such that each VF is associated with a VLAN-ID. It is noted that a packet transmitted by the VM can use either or both of the logical ports of the NVD. Whether the packet utilizes either or both, or one or the other port is dependent upon the configuration of the NVD (e.g., is the NVD configured for Active/Active operation or Active/Backup operation) as well as on the "state" of the interfaces of the NVD (e.g., are both interfaces up and running, or is one interface down/in backup mode).

In step 1103, the NVD 926 upon receiving the packet performs a lookup operation in a VCN forwarding table. Specifically, the NVD 926 obtains information of the substrate IP address of the NVD that serves the remote host i.e., the NVD 926 obtains information of the substrate IP address A100 of the remote NVD 913 that serves the remote host.

In step 1105, the NVD modifies the header of the packet. Specifically, NVD 926 encapsulates the packet e.g., VCN header with information corresponding to the substrate IP address (A100) of the remote NVD 913 as being the intended destination of the packet and its own software interface IP address A254 as being the source of the packet. Thereafter, the NVD 926 attempts to transmit the packet to the remote host.

In step 1107, the NVD 926 determines as to how the packet is to be forwarded to the remote NVD 1113. By one embodiment, the NVD 926 realizes that it has two routes to send the packet to the remote host machine i.e., one route through TOR #1 922, and the other route through TOR #2 924. Specifically, NVD 926 realizes the two routes via BGP communication performed with the two TORs. The NVD 926 performs an equal cost multipath (ECMP) flow hashing to select one of the two TORs to forward the packet over to the remote NVD 913. In step 1109, the packet traverses via the selected TOR (e.g., TOR #1) to traverse via the network fabric to eventually reach the remote TOR serving the remote host machine. Further, in steps 1111 and 1113, the packet traverses the remote TOR 915 to reach the remote NVD 913. The remote NVD 913 de-capsulates the packet to retrieve the destination address (i.e., B100) included in the packet and eventually serves the remote host 911 with the packet.

Figure 11B:
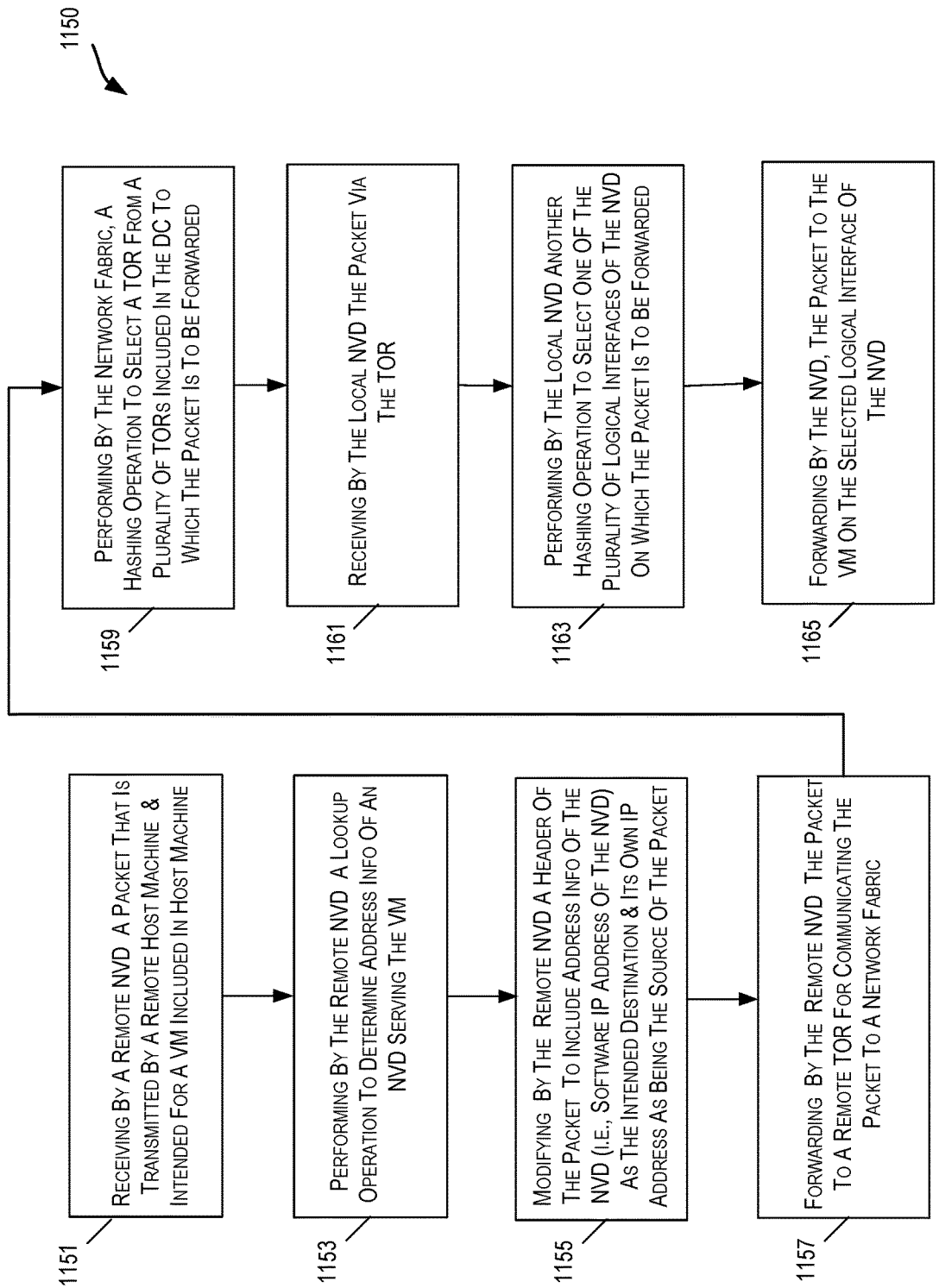
FIG. 11B depicts a flowchart illustrating steps performed in transmission of a packet from a remote host outside the datacenter to a compute host included in the datacenter, according to some embodiments.

Turning now to FIG. 11B, there is depicted a flowchart illustrating steps performed in transmission of a packet from the remote host (e.g., remote host 911 in FIG. 9) to the compute host (e.g., host 928 in FIG. 9). The processing depicted in FIG. 11B may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 11B and described below is intended to be illustrative and non-limiting. Although FIG. 11B depicts the various processing steps occurring in a particular sequence or order, this is not intended to be limiting. In certain alternative embodiments, the steps may be performed in some different order or some steps may also be performed in parallel.

The process commences in step 1151, where a VM in the remote host 911 having an overlay IP address of B100, sends the packet destined for VM1 (having overlay IP address of B2) to NVD 913. It is appreciated that in the description of FIG. 11B, it is assumed that both the remote host machine and the local host machines are included in the DRCC. Note however, that if the remote host machine is located outside the DRCC, then a packet transmitted by such remote host 'enters' into the DRCC using means such as FastConnect (or IPSec VPN) and then uses a DRG to reach an NVD of a host machine included in the DRCC.

In step 1153, the NVD 913 upon receiving the packet performs a lookup operation in a VCN forwarding table. Specifically, the NVD 913 determines that VM1 having overlay address of B2 is served by NVD having a loopback IP address of A254.

In step 1155, NVD 913 encapsulates the packet e.g., VCN header with information corresponding to the loopback IP address (A254) of NVD 926 as being the intended destination of the packet and its own substrate IP address (A100) as being the source of the packet. Thereafter, in step 1157, the NVD 913 forwards the packet to the remote TOR, which further passes the packet to the network fabric 920.

In step 1159, the network fabric 920 upon receiving the packet performs a hashing operation (e.g., a modulo-2 operation) to select one of the routes (via TOR #1 or TOR #2) to forward the packet to the NVD 926. It is appreciated that the hashing operation performed by switches (e.g., in the network fabric) may be different than the hashing operation performed by the NVDs.

In step 1161 the NVD 926 receives the packet. In step 1163, the NVD 926 may perform another hashing operation to select one of the two logical ports (e.g., ports having overlay IP addresses of B1 and C1) to forward the packet to VM1, which is the intended destination of the packet. It is appreciated that as stated previously, the packet can arrive on either of the ports of the NVD. For instance, if the NVD is configures in an Active/Active operation mode, then in one implementation, roughly half the flows would arrive on either port. However, if the NVD is configured in the Active/Backup operation mode, then all the flows would arrive on the active port (until there is a failure of the active port). In step 1165, the NVD forwards the packet to the VM on the selected logical interface of the NVD.

According to some embodiments, traffic originating from local host machine and destined to a remote host machine and vice versa, is statistically load balanced (e.g., via utilizing ECMP routing) over the dual TORs 922, and 924. An advantage of using dual TORs in the DRCC architecture is that of failover i.e., traffic from a failed TOR can be switched over to the other (functioning) TOR. Furthermore, the architecture of FIG. 9 also results in reduced hardware being used i.e., usage of a single local NVD (e.g., smartNIC) as opposed to multiple smartNICs. Additionally, it is noted that the above-described mechanism of utilizing dual TORs is in no way limited to being used only in a datacenter-on-premise architecture as described above. Rather, the concepts of utilizing dual TORs as described herein are equally applicable to any deployment—i.e., commercial regions or DRCC or any other type of network deployment.

Figure 12:
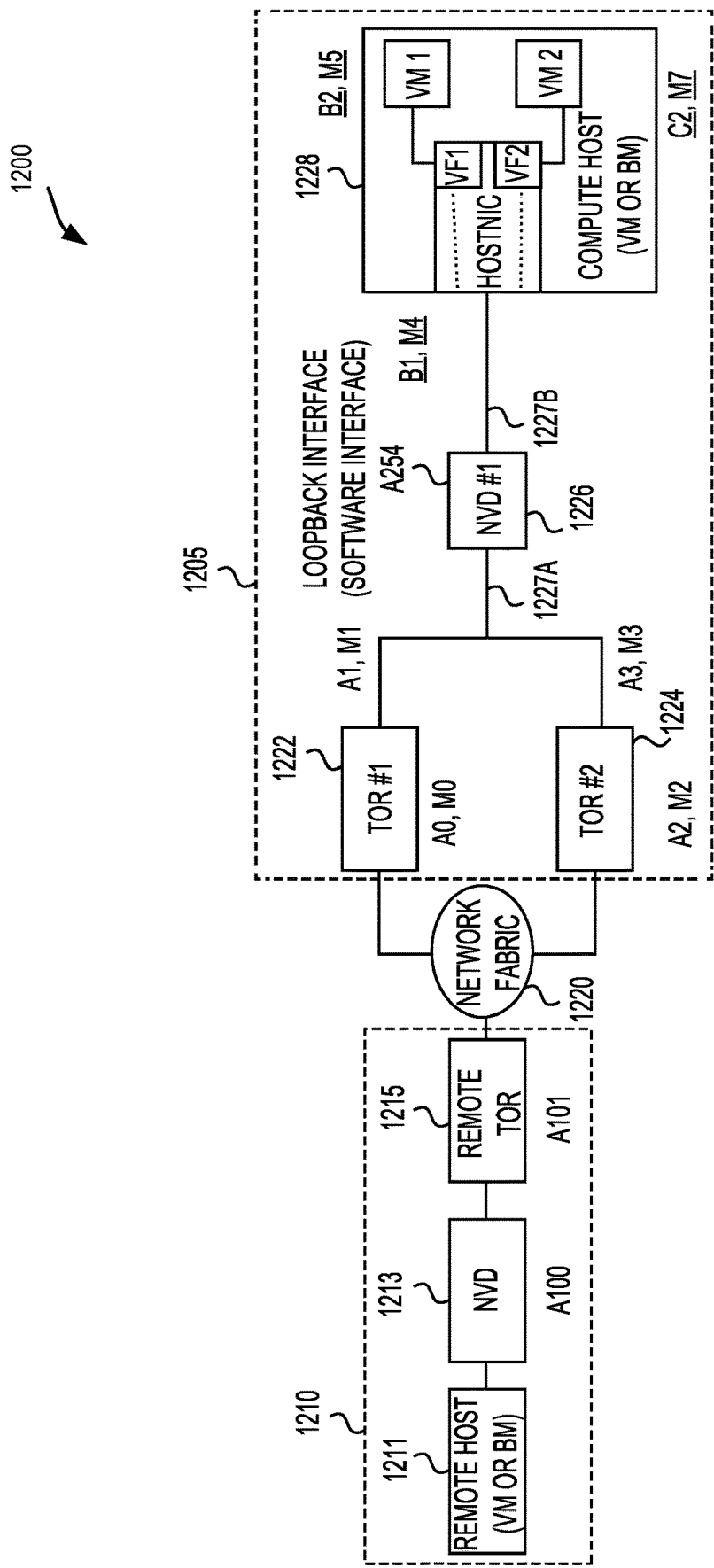
FIG. 12 depicts another exemplary infrastructure of a DRCC according to some embodiments.

Turning now to FIG. 12, there is depicted another exemplary architecture 1200 of a DRCC framework that brings to customers, the full capabilities of a public cloud. In doing so, the customer can reduce infrastructure and operational costs, upgrade legacy applications on modern cloud services, and meet the most demanding regulatory, data residency, and latency requirements. FIG. 12 depicts a datacenter 1205, which includes a host machine 1228 that is coupled via a network fabric 1220 to a remote host machine 1211. It is appreciated that the remote host machine can be 'any' host machine such as: (i) another host inside the DRCC and which is located behind another NVD, or (ii) another host in another DRCC and located behind another NVD, or (iii) a host included in a customer's on-premise network. It is noted that for the host included in the on-premise network, may connect to the DRCC via Fast-Connect or IPSec VPN and use a dynamic routing gateway (DRG) to connect to host 928. For sake of illustration, in the following description, it is assumed that the remote host (e.g., host 1211) is one which is included in the DRCC and located behind another NVD (e.g., NVD 1213 and served by a remote TOR 1215). However, it is noted that the features described below are equally applicable to the other cases of the remote hosts outline above.

The datacenter 1205 includes a pair of TORs i.e., TOR #1 1222 and TOR #2 1224, a network virtualization platform e.g., NVD 1226, and a compute host machine 1228 (i.e., the host machine referred to herein as local host machine). The NVD 1226 is referred to herein as a local NVD. The compute host machine 1228 includes a host network interface card (i.e., host NIC) and a plurality of virtual machines (VMs). For sake of illustration, FIG. 12 depicts the compute host 1228 as comprising two virtual machines i.e., VM1 and VM2, respectively. It is noted that each of the VMs is communicatively coupled to the host NIC via one of the logical interfaces (e.g., logical interfaces depicted as PF1 and PF2, respectively). Furthermore, it is noted that the local NVD 1226 may be disposed on the same chassis as the host NIC included in the compute instance 1228.

According to some embodiments, the local NVD 1226 has multiple physical ports. For instance, in one implementation as shown in FIG. 12, the local NVD 1226 has two physical ports-a first physical port 1227A (referred to herein as a TOR facing port) that is connected to the TORs 1222 and 1224 respectively, and a second physical port 1227B (referred to herein as a host facing port) that is connected to the compute host 1228. The physical port 1227A of the local NVD 1226 can be divided into multiple logical ports. For instance, as shown in FIG. 12, the physical port 1227A is divided into two logical ports on the TOR facing side i.e., each of the logical ports is connected to a respective TOR included in the datacenter. The physical port 1227B is connected to the host NIC. Thus, in contrast to the DRCC implementation of FIG. 9, the DRCC implementation of FIG. 12 includes a single connection from the NVD 1226 to the host NIC included in the compute instance 1228. As such, the host NIC is associated with a single pair of IP overlay and MAC addresses (i.e., B1 and M4). This overlay IP address of the host NIC can be reached via two substrate paths i.e., via different TORs (i.e., TOR #1 and TOR #2) thereby providing TOR redundancy.

Figure 13:
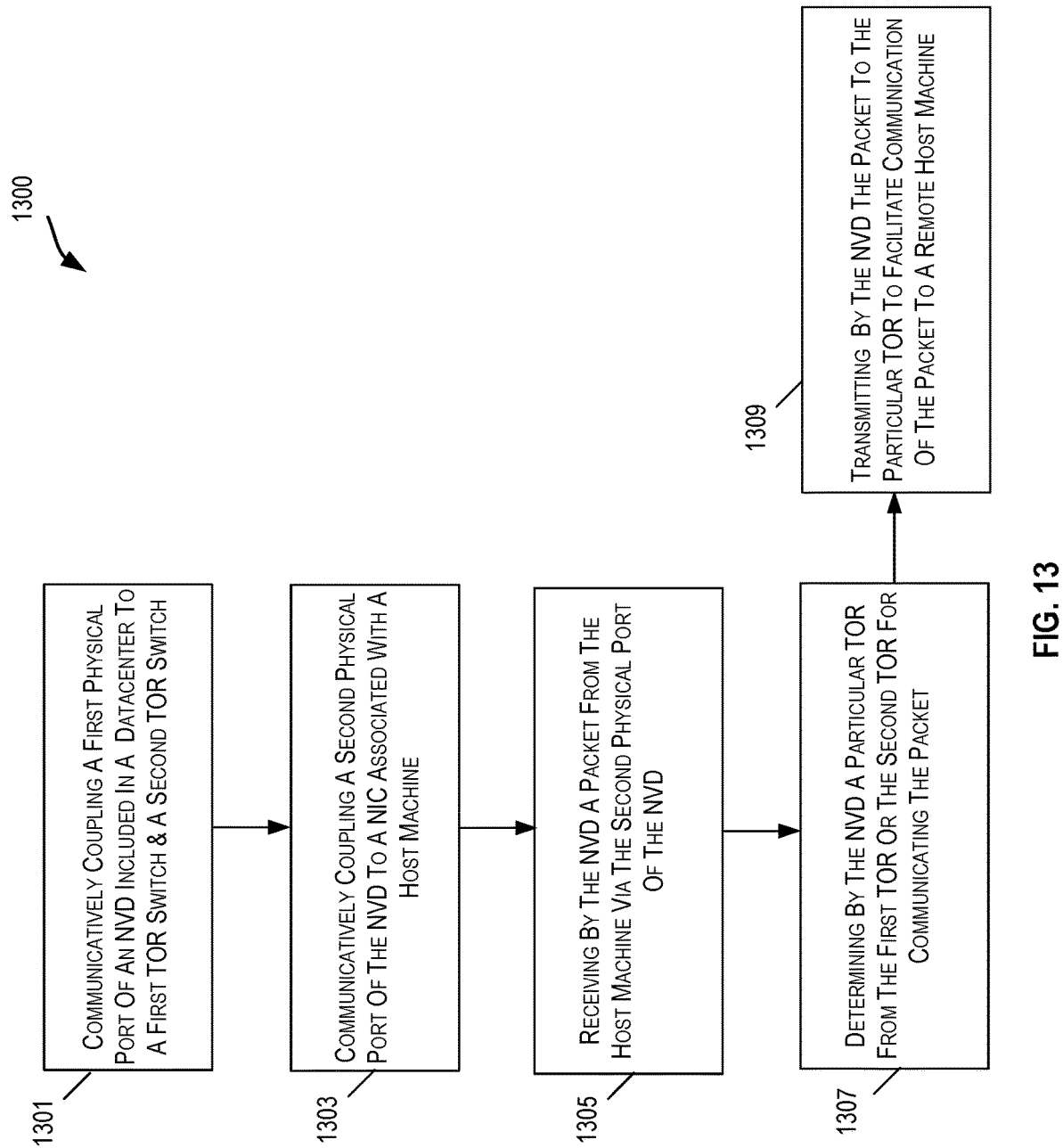
FIG. 13 depicts a flowchart illustrating another process of providing a DRCC to a customer on-premise location according to some embodiments.

FIG. 13 depicts a flowchart illustrating another process of providing a DRCC according to some embodiments. The processing depicted in FIG. 13 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 13 and described below is intended to be illustrative and non-limiting. Although FIG. 13 depicts the various processing steps occurring in a particular sequence or order, this is not intended to be limiting. In certain alternative embodiments, the steps may be performed in some different order or some steps may also be performed in parallel. In some implementations, the method illustrated in FIG. 13 may be performed by a cloud service provider to provide DRCC to a customer.

The process commences in step 1301, where a first physical port of a network virtualization device (NVD) that is included in a datacenter is communicatively coupled to a first top-of-rack (TOR) switch and a second TOR switch. It is noted that the first and second TOR switches may be included in a rack (as shown in FIGS. 6 and 7). In step 1303, a second physical port of the NVD is communicatively coupled with a network interface card (NIC) associated with a host machine included in the datacenter.

The process then moves to step 1305, where the NVD receives a packet from the host machine via the second physical port. In step 1307, the NVD determines a particular TOR from a group including the first TOR and the second TOR, for communicating the packet. According to some embodiments, the NVD may execute an equal cost multipath routing (ECMP) flow hashing to select one of the two TORs. Further, in step 1309, the NVD transmits the packet to the particular TOR in order to facilitate communication of the packet to the remote host machine e.g., remote host 1211 of FIG. 12.

Dedicated Region Cloud at Customer (DRCC) corresponds to providing an infrastructure of a cloud service provider in a customer's own datacenter. The DRCC framework brings the full capabilities of the public cloud on-premises, so that enterprises can reduce infrastructure and operational costs, upgrade legacy applications on modern cloud services, and meet the most demanding regulatory, data residency, and latency requirements—all with the infrastructure of the CSP. Thus, designing a network architecture that has a small footprint and that enables cloud services to be provided at customers chosen on-premise location is desired. A naïve solution to enable the DRCC framework is to use a network design as used in commercial regions. However, a drawback of such an approach is that customers typically do not have the power and space requirements to deploy such a network, and moreover customers may not be able to utilize the full scale of such a network architecture. Thus, a novel network architecture with a reduced footprint (e.g., a smaller number of devices, racks, etc.) is required to provide cloud services to customers at a location of their choosing.

Figure 14:
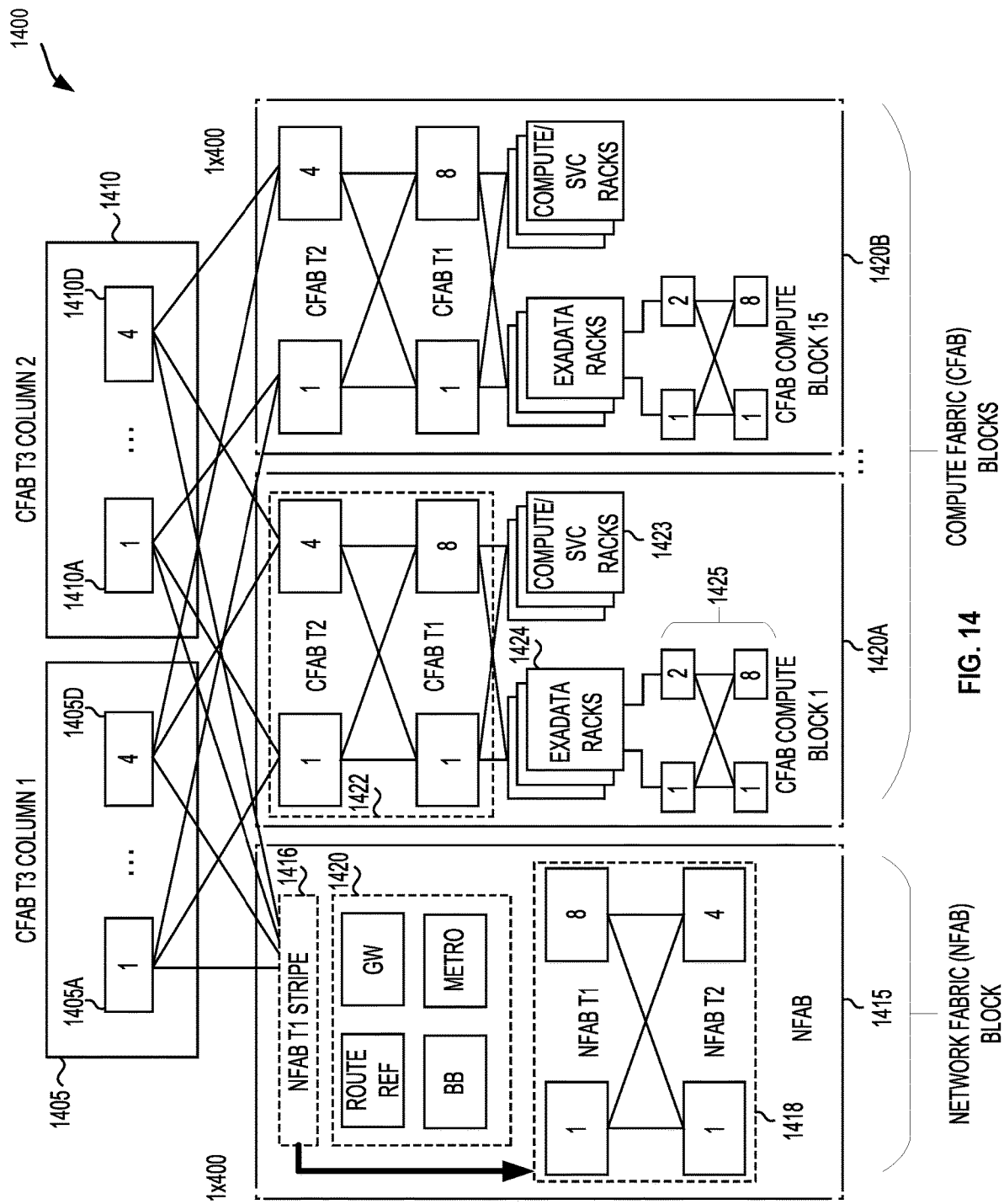
FIG. 14 depicts an exemplary network fabric architecture of a DRCC according to some embodiments.

FIG. 14 depicts an exemplary network fabric architecture of a DRCC according to some embodiments. The network fabric architecture 1400 for the DRCC includes a combination of compute fabric blocks (referred to herein as CFABs, 1420A-1420B) and a network fabric block (referred to herein as NFAB, 1415). The NFAB 1415 is communicatively coupled to each of the CFAB blocks (1420A-1420B) via a plurality of blocks of switches (1405, 1410). The plurality of blocks of switches is also referred to the herein as Tier 3 (T3) level switches. Each plurality of blocks of switches includes a predetermined number of switches e.g., four switches. For example, the block of switches 1405 includes four switches labeled 1405A-1405D, and the block of switches 1410 includes four switches labeled 1410A-1410D.

According to some embodiments, a compute fabric block (e.g., CFAB block 1420A) is communicatively coupled to the plurality of blocks of switches 1405, 1410. The compute fabric block 1420A includes a set of one or more racks, e.g., Exadata racks 1424 or compute racks 1423. Each rack in the set of one or more racks comprises one or more servers configured to execute one or more workloads of a customer. It is appreciated that each Exadata rack 1424 may be associated with a cluster network of virtual machines 1425. The CFAB block 1420A further includes a first plurality of switches 1422 organized into a first plurality of levels (e.g., levels labeled CFAB T1 and CFAB T2). The first plurality of switches 1422 communicatively couples the set of one or more racks (e.g., rack 1423, 1424) to the plurality of blocks of switches (1405, 1410). Specifically, the first plurality of levels associated with the first plurality of switches 1422 in the compute fabric block 1420A includes: (i) a first tier-one level of switches i.e., CFAB T1, and (ii) a first tier-two level of switches i.e., CFAB T2.

The first tier-one level of switches are communicatively coupled at a first end to the set of one or more racks and are communicatively coupled at a second end to the first tier-two level of switches. In turn, the first tier-two level of switches i.e., CFAB T2, connects the first tier-one level of switches i.e., CFAB T1, to the plurality of blocks of switches 1405, 1410. In one implementation, the first tier-one level of switches (CFAB T1) in the compute fabric block includes eight switches, and the first tier-two level of switches (CFAB T2) in the compute fabric block includes four switches. Each switch in the first tier-one level of switches in the compute fabric block is connected to each switch in the first tier-two level of switches in the compute fabric block. In turn, each switch in the first tier-two level of switches (CFAB T2) in the compute fabric block is connected to at least one switch in each block of the plurality of blocks of switches 1405, 1410.

According to some embodiments, the NFAB block 1415 is communicatively coupled to the plurality of blocks of switches 1405, 1410. The network fabric block 1415 includes: (i) one or more edge devices 1420, and (ii) a second plurality of switches 1418 that are organized into a second plurality of levels. The one or more edge devices 1420 includes a first edge device that provides connectivity to a first external resource. For example, the first external resource may be a public communication network, e.g., Internet, and the first edge device may be a gateway that provides connectivity to the public communication network. The one or more edge devices 1420 may include a gateway, a backbone edge device, a metro edge device, and a route reflector. Accordingly, the first edge devices e.g., gateway, enables access to the first external resource (e.g., Internet) to a workload that is executed by a server included in a rack in the set of one or more racks included in the CFAB block 1420A.

The second plurality of switches 1418 that are organized into a second plurality of levels (labeled NFAB T1 and NFAB T2) communicatively couple the one or more edge devices 1420 to the plurality of blocks of switches 1405, 1410. The connections between the plurality of blocks of switches and the second plurality of switches 1418 is depicted as a logical construct 1416 (NFAB T1 stripe) in FIG. 14. The detailed connections of the logical construct 1416 are described later with reference to FIG. 15. According to some embodiments, the second plurality of levels associated with the second plurality of switches 1418 in the network fabric block 1415 includes: (i) a second tier-one level of switches i.e., NFAB T1, and (ii) a second tier-two level of switches i.e., NFAB T2. Each switch in the second tier-two level of switches is communicatively coupled to each switch included in the second tier-one level of switches i.e., NFAB T1. In one implementation, the second tier-one level of switches in the network fabric block include eight switches, and the second tier-two level of switches in the network fabric block include four switches.

According to some embodiments, an initial deployment of the DRCC network architecture includes deploying the NFAB block (1415), one CFAB block (1420A), and the T3 switch layer (i.e., the plurality of blocks of switches 1405, 1410) that interconnects the NFAB to the CFAB. It is appreciated that additional CFAB blocks (as well as additional T3 layer switch blocks) may be deployed on the fly (i.e., in real time) based on customer demands. It is appreciated that the number of switches described above with reference to the first tier-one level of switches or the second tier-one level of switches in the network fabric (e.g., eight switches) are for illustrative purposes only. The number of switches included in the first tier-one level, or the second tier-one level may be any other number of switches such as four or sixteen or a variable number of switches. In a similar manner, the second tier-two level of switches in the network fabric block as described above includes four switches. However, it is appreciated that this is for illustrative purposes only and that the actual number of switched in this level may be a variable number of switches e.g., half of the number of switches at Tier-1.

Figure 15:
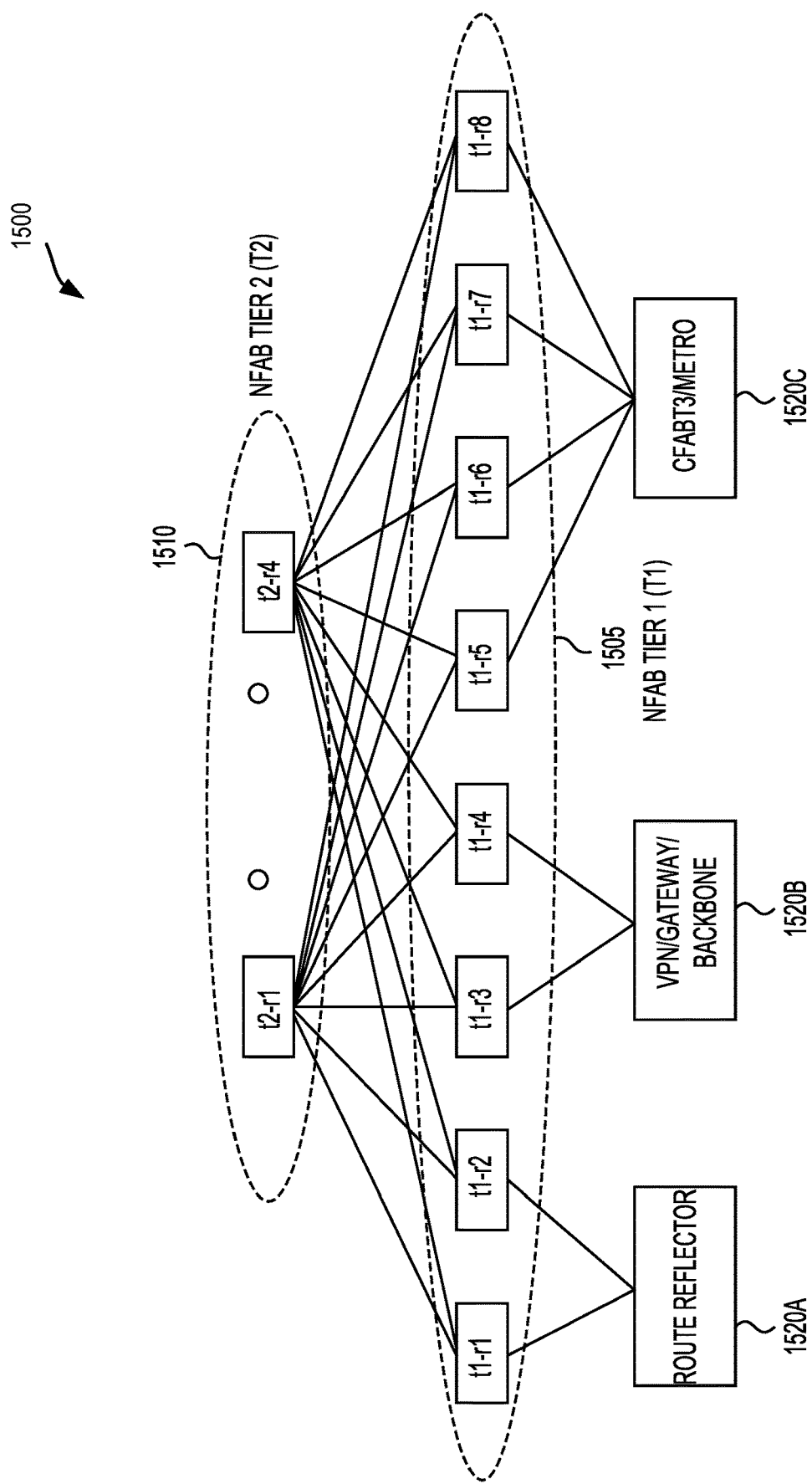
FIG. 15 illustrates connections between the NFAB block and a plurality of blocks of switches as well as connections within the NFAB block according to some embodiments.

FIG. 15 illustrates connections between the NFAB block and the plurality of blocks of switches, as well as connections within the NFAB block i.e., between the second plurality of switches that are organized into the second plurality of levels in the NFAB. The second plurality of levels associated with the second plurality of switches in the NFAB includes: (i) a second tier-one level of switches (i.e., NFAB Tier 1, 1505) and (ii) a second tier-two level of switches (i.e., NFAB Tier 2, 1510). In one example, the second tier-one level of switches in the NFAB includes eight switches (labeled in FIG. 15 as t1-r1 to t1-r8), and the second tier-two level of switches in the network fabric block include four switches (labeled in FIG. 15 as t2-r1 to t2-r4).

As shown in FIG. 15, a first subset of switches included in the second tier-one level of switches (i.e., NFAB Tier 1) are communicatively coupled, at a first end, to the one or more edge devices. For instance, as shown in FIG. 15, switches t1-r1, t1-r2, t1-r3, t1-r4 are coupled to route reflector 1520A and VPN gateway 1520, respectively. Further, a second subset of switches included in the second tier-one level of switches (e.g., switches t1-r5, t1-r6, t1-r7, and t1-r8) are communicatively coupled, at the first end, to the plurality of blocks of switches (i.e., labeled in FIG. 15 as CFAB Tier 3). It is noted that the second subset of switches may also be coupled with WDM metro switch i.e., a switch used for interconnecting racks situated in different buildings. The first subset and the second subset of switches included in the second tier-one level of switches are coupled, at a second end, to the second tier-two level of switches included in the network fabric block.

Specifically, in order to provide connectivity between switches of the T1 layer 1505, a T2 layer of switches (e.g., four switches) 1510 is employed in the NFAB. As shown, each of the four switches included in the T2 layer switches of the NFAB connects to each T1 layer switch. In this manner, service enclaves included in the different CFAB blocks are communicatively coupled to edge devices via the NFAB fabric. Thus, a workload executed by a server included in a rack of the compute fabric block accesses the first external resource (e.g., Internet) by establishing a connection to a first switch in the plurality of blocks of switches. Referring to FIG. 15, this connection is further routed as follows: (i) from the first switch to a second switch included in the second subset of switches in the second tier-one level of switches (e.g., switches t1-r5, t1-r6, t1-r7, and t1-r8), (ii) from the second switch to a third switch included in the second tier-two level of switches (e.g., one of the switches from the group of switches t1-r1, t1-r2, t1-r3, t1-r4), (iii) from the third switch to a fourth switch included in the first subset of switches in the second tier-one level of switches (e.g., switches t1-r1, t1-r2, t1-r3, and t1-r4), and (iv) from the fourth switch to a gateway. It is appreciated that the CFAB and JFAB blocks described above with respect to FIGS. 14 and 15 support 400G connections and operate at a power budget of 100 KW. The architecture includes a total of 3 network racks and an optional fourth rack to support backbone and metro connections.

Figure 16:
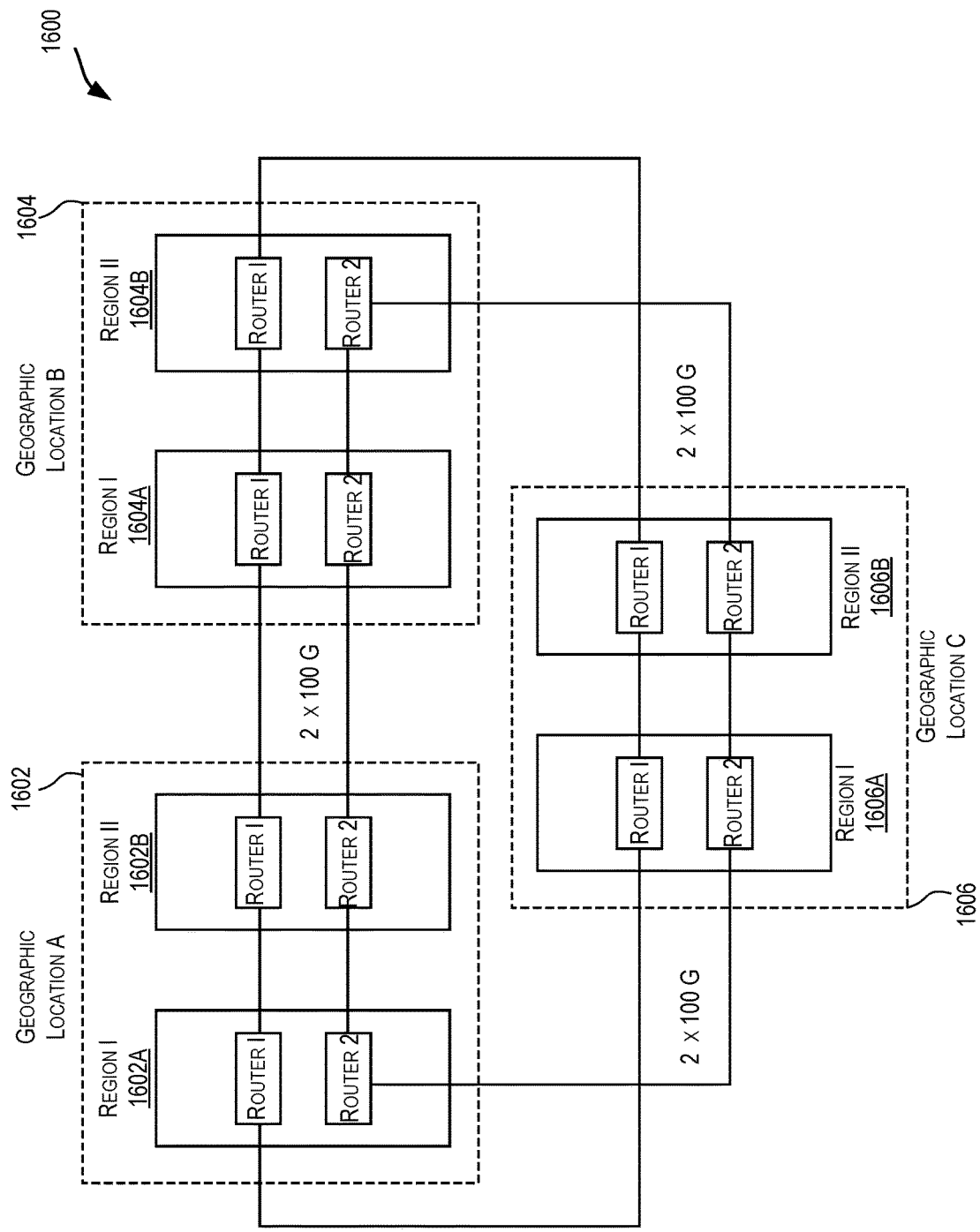
FIG. 16 illustrates an exemplary dedicated backbone network for customer regions, according to some embodiments.

FIG. 16 illustrates an exemplary dedicated backbone network for customer regions, according to some embodiments. FIG. 16 depicts several geographical locations (e.g., countries) where customer DRCC may be deployed. For instance, FIG. 16 depicts three geographical locations i.e., geographical location A 1602, geographical location B 1604, and geographical location C 1606 where customer DRCCs are deployed. Within each geographical location, it is assumed that the customer has a DRCC deployed in two regions within the geographical location. For instance, geographical location A has two regions-region I 1602A and region II 1602B, geographical location B has two regions-region I 1604A and region II 1604B, and geographical location C has two regions-region I 1606A and region II 1606B, respectively where customer DRCCs are deployed.

Each region includes a pair of dedicated backbone routers i.e., router 1 and router 2. Router 1 of each region are connected sequentially as shown in FIG. 16 to form a dedicated backbone ring network. In a similar manner, router 2 of each region are connected sequentially as shown in FIG. 16 to form another dedicated backbone ring network. It is appreciated that the pair of dedicated backbone ring networks is dedicated for the customer i.e., no other traffic is permitted on the backbone network. The backbone network may support 10G or 100G encrypted connections, and provide for single link failures i.e., disruption of a single backbone link included in either ring formed by routers' 1 or the ring formed by routers' 2, does not disturb traffic on the backbone network. It is appreciated that the ring topology depicted in FIG. 16 is for illustrative purposes only. The backbone network topology may be a mesh, a toroid, or any other topology based on certain criteria such as a number of DRCC regions desired by the customer and/or latency and bandwidth requirements of the customer.

Figure 17:
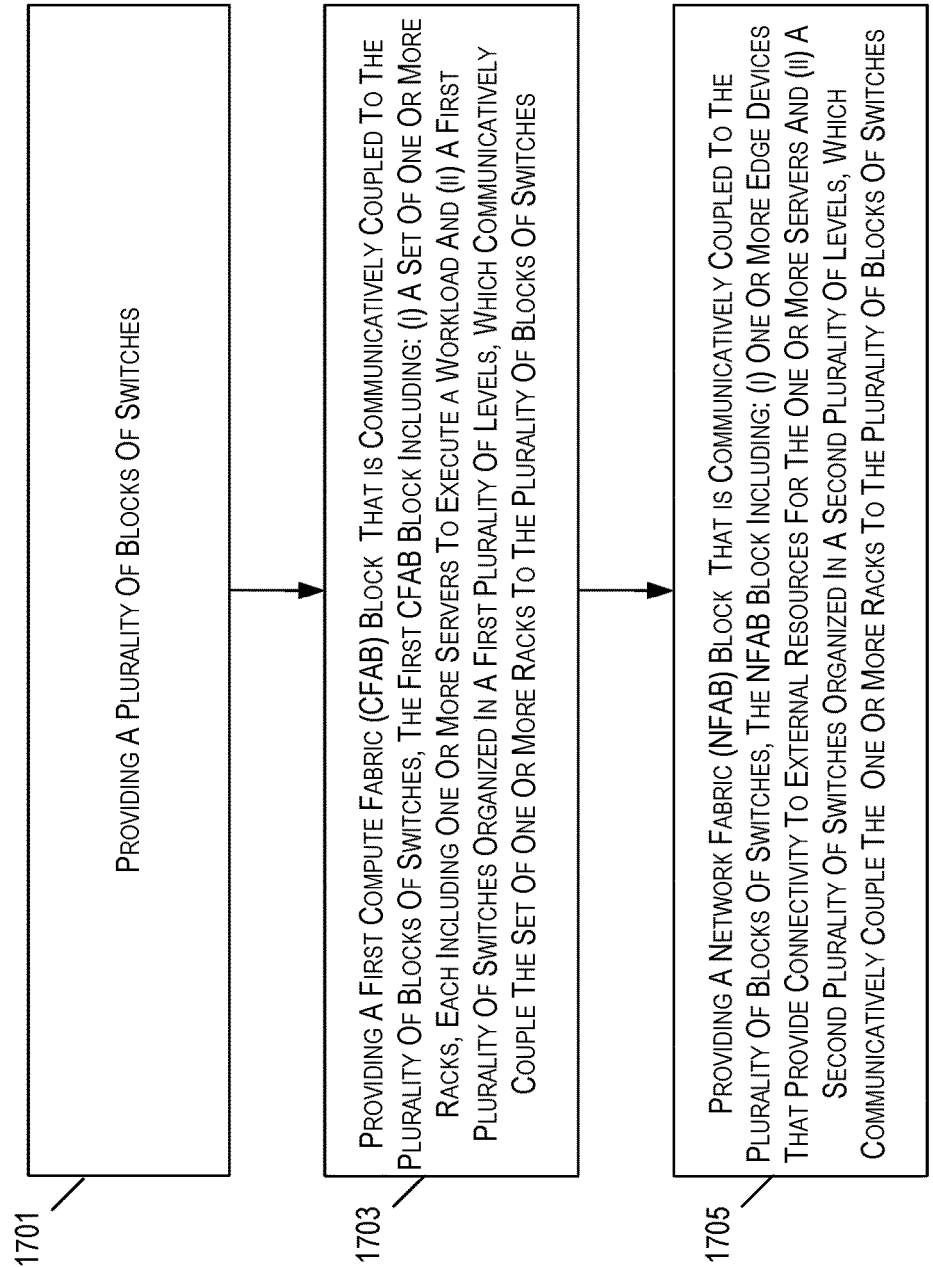
FIG. 17 depicts a flowchart illustrating a process of constructing a network fabric according to some embodiments.

Turning to FIG. 17, there is depicted a flowchart illustrating a process of constructing a network fabric according to some embodiments. The processing depicted in FIG. 17 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 17 and described below is intended to be illustrative and non-limiting. Although FIG. 17 depicts the various processing steps occurring in a particular sequence or order, this is not intended to be limiting. In certain alternative embodiments, the steps may be performed in some different order or some steps may also be performed in parallel. In some implementations, the method illustrated in FIG. 17 may be performed by a cloud service provider to provide DRCC to a customer.

The process commences in step 1701, where a plurality of blocks of switches are provided. These correspond to blocks of switches 1405 and 1410 as shown in FIG. 14. The process then moves to step 1703, where a first compute fabric block is provided that is communicatively coupled to the plurality of blocks of switches. The first compute fabric block including: (i) a set of one or more racks, and (ii) a first plurality of switches organized into a first plurality of levels. Each rack in the set of one or more racks comprised one or more servers that is configured to execute one or more workloads of a customer. The first plurality of switches communicatively couples the set of one or more racks to the plurality of blocks of switches.

The process thereafter moves to step 1705, where a network fabric block is provided that is communicatively coupled to the plurality of blocks of switches. The network fabric block includes: (i) one or more edge devices including, and (ii) a second plurality of switches organized into a second plurality of levels. A first edge device provides connectivity to a first external resource. For instance, the first external resource may be a public communication network (e.g., Internet), and the first edge device is a gateway providing connectivity to the public communication network. The first edge device enables access to the first external resource by a workload executed by a server included in a rack in the set of one or more racks. The second plurality of switches communicatively couples the one or more edge devices to the plurality of blocks of switches.

Example Cloud Infrastructure Embodiment

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like. In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 18:
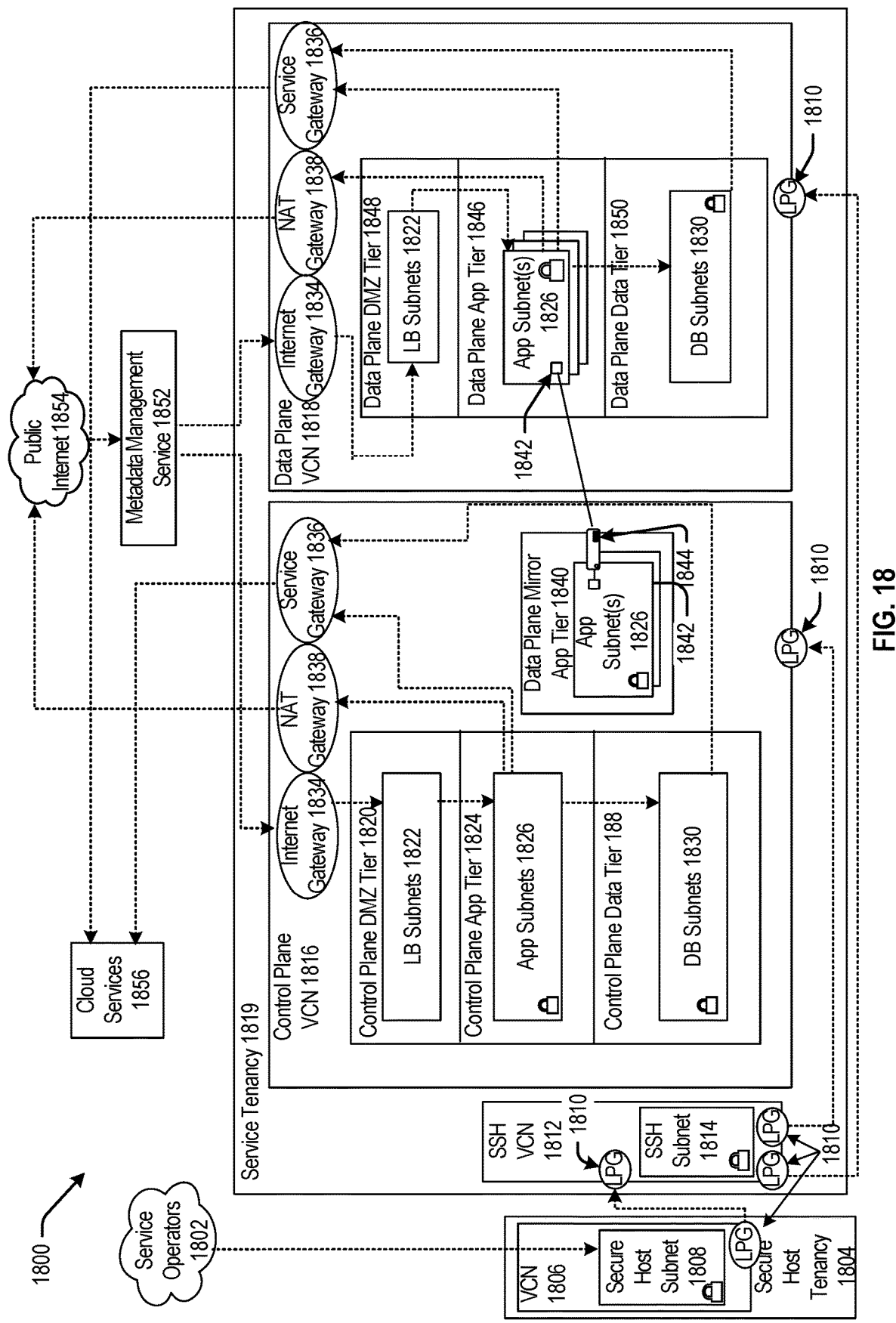
FIG. 18 is a block diagram illustrating one pattern for implementing a cloud infrastructure as a service system, according to at least one embodiment.

FIG. 18 is a block diagram 1800 illustrating an example pattern of an IaaS architecture, according to at least one embodiment. Service operators 1802 can be communicatively coupled to a secure host tenancy 1804 that can include a virtual cloud network (VCN) 1806 and a secure host subnet 1808. In some examples, the service operators 1802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1806 and/or the Internet.

The VCN 1806 can include a local peering gateway (LPG) 1810 that can be communicatively coupled to a secure shell (SSH) VCN 1812 via an LPG 1810 contained in the SSH VCN 1812. The SSH VCN 1812 can include an SSH subnet 1814, and the SSH VCN 1812 can be communicatively coupled to a control plane VCN 1816 via the LPG 1810 contained in the control plane VCN 1816. Also, the SSH VCN 1812 can be communicatively coupled to a data plane VCN 1818 via an LPG 1810. The control plane VCN 1816 and the data plane VCN 1818 can be contained in a service tenancy 1819 that can be owned and/or operated by the IaaS provider.

The control plane VCN 1816 can include a control plane demilitarized zone (DMZ) tier 1820 that acts as a perimeter network (e.g., portions of a corporate network between the corporate intranet and external networks). The DMZ-based servers may have restricted responsibilities and help keep security breaches contained. Additionally, the DMZ tier 1820 can include one or more load balancer (LB) subnet(s) 1822, a control plane app tier 1824 that can include app subnet(s) 1826, a control plane data tier 1828 that can include database (DB) subnet(s) 1830 (e.g., frontend DB subnet(s) and/or backend DB subnet(s)). The LB subnet(s) 1822 contained in the control plane DMZ tier 1820 can be communicatively coupled to the app subnet(s) 1826 contained in the control plane app tier 1824 and an Internet gateway 1834 that can be contained in the control plane VCN 1816, and the app subnet(s) 1826 can be communicatively coupled to the DB subnet(s) 1830 contained in the control plane data tier 1828 and a service gateway 1836 and a network address translation (NAT) gateway 1838. The control plane VCN 1816 can include the service gateway 1836 and the NAT gateway 1838.

The control plane VCN 1816 can include a data plane mirror app tier 1840 that can include app subnet(s) 1826. The app subnet(s) 1826 contained in the data plane mirror app tier 1840 can include a virtual network interface controller (VNIC) 1842 that can execute a compute instance 1844. The compute instance 1844 can communicatively couple the app subnet(s) 1826 of the data plane mirror app tier 1840 to app subnet(s) 1826 that can be contained in a data plane app tier 1846.

The data plane VCN 1818 can include the data plane app tier 1846, a data plane DMZ tier 1848, and a data plane data tier 1850. The data plane DMZ tier 1848 can include LB subnet(s) 1822 that can be communicatively coupled to the app subnet(s) 1826 of the data plane app tier 1846 and the Internet gateway 1834 of the data plane VCN 1818. The app subnet(s) 1826 can be communicatively coupled to the service gateway 1836 of the data plane VCN 1818 and NAT gateway 1838 of the data plane VCN 1818. The data plane data tier 1850 can also include the DB subnet(s) 1830 that can be communicatively coupled to the app subnet(s) 1826 of the data plane app tier 1846.

The Internet gateway 1834 of the control plane VCN 1816 and of the data plane VCN 1818 can be communicatively coupled to a metadata management service 1852 that can be communicatively coupled to public Internet 1854. Public Internet 1854 can be communicatively coupled to the NAT gateway 1838 of the control plane VCN 1816 and of the data plane VCN 1818. The service gateway 1836 of the control plane VCN 1816 and of the data plane VCN 1818 can be communicatively couple to cloud services 1856.

In some examples, the service gateway 1836 of the control plane VCN 1816 or of the data plan VCN 1818 can make application programming interface (API) calls to cloud services 1856 without going through public Internet 1854. The API calls to cloud services 1856 from the service gateway 1836 can be one-way: the service gateway 1836 can make API calls to cloud services 1856, and cloud services 1856 can send requested data to the service gateway 1836. But, cloud services 1856 may not initiate API calls to the service gateway 1836.

In some examples, the secure host tenancy 1804 can be directly connected to the service tenancy 1819, which may be otherwise isolated. The secure host subnet 1808 can communicate with the SSH subnet 1814 through an LPG 1810 that may enable two-way communication over an otherwise isolated system. Connecting the secure host subnet 1808 to the SSH subnet 1814 may give the secure host subnet 1808 access to other entities within the service tenancy 1819.

The control plane VCN 1816 may allow users of the service tenancy 1819 to set up or otherwise provision desired resources. Desired resources provisioned in the control plane VCN 1816 may be deployed or otherwise used in the data plane VCN 1818. In some examples, the control plane VCN 1816 can be isolated from the data plane VCN 1818, and the data plane mirror app tier 1840 of the control plane VCN 1816 can communicate with the data plane app tier 1846 of the data plane VCN 1818 via VNICs 1842 that can be contained in the data plane mirror app tier 1840 and the data plane app tier 1846.

In some examples, users of the system, or customers, can make requests, for example create, read, update, or delete (CRUD) operations, through public Internet 1854 that can communicate the requests to the metadata management service 1852. The metadata management service 1852 can communicate the request to the control plane VCN 1816 through the Internet gateway 1834. The request can be received by the LB subnet(s) 1822 contained in the control plane DMZ tier 1820. The LB subnet(s) 1822 may determine that the request is valid, and in response to this determination, the LB subnet(s) 1822 can transmit the request to app subnet(s) 1826 contained in the control plane app tier 1824. If the request is validated and requires a call to public Internet 1854, the call to public Internet 1854 may be transmitted to the NAT gateway 1838 that can make the call to public Internet 1854. Memory that may be desired to be stored by the request can be stored in the DB subnet(s) 1830.

In some examples, the data plane mirror app tier 1840 can facilitate direct communication between the control plane VCN 1816 and the data plane VCN 1818. For example, changes, updates, or other suitable modifications to configuration may be desired to be applied to the resources contained in the data plane VCN 1818. Via a VNIC 1842, the control plane VCN 1816 can directly communicate with, and can thereby execute the changes, updates, or other suitable modifications to configuration to, resources contained in the data plane VCN 1818.

In some embodiments, the control plane VCN 1816 and the data plane VCN 1818 can be contained in the service tenancy 1819. In this case, the user, or the customer, of the system may not own or operate either the control plane VCN 1816 or the data plane VCN 1818. Instead, the IaaS provider may own or operate the control plane VCN 1816 and the data plane VCN 1818, both of which may be contained in the service tenancy 1819. This embodiment can enable isolation of networks that may prevent users or customers from interacting with other users', or other customers', resources. Also, this embodiment may allow users or customers of the system to store databases privately without needing to rely on public Internet 1854, which may not have a desired level of security, for storage.

In other embodiments, the LB subnet(s) 1822 contained in the control plane VCN 1816 can be configured to receive a signal from the service gateway 1836. In this embodiment, the control plane VCN 1816 and the data plane VCN 1818 may be configured to be called by a customer of the IaaS provider without calling public Internet 1854. Customers of the IaaS provider may desire this embodiment since database(s) that the customers use may be controlled by the IaaS provider and may be stored on the service tenancy 1819, which may be isolated from public Internet 1854.

Figure 19:
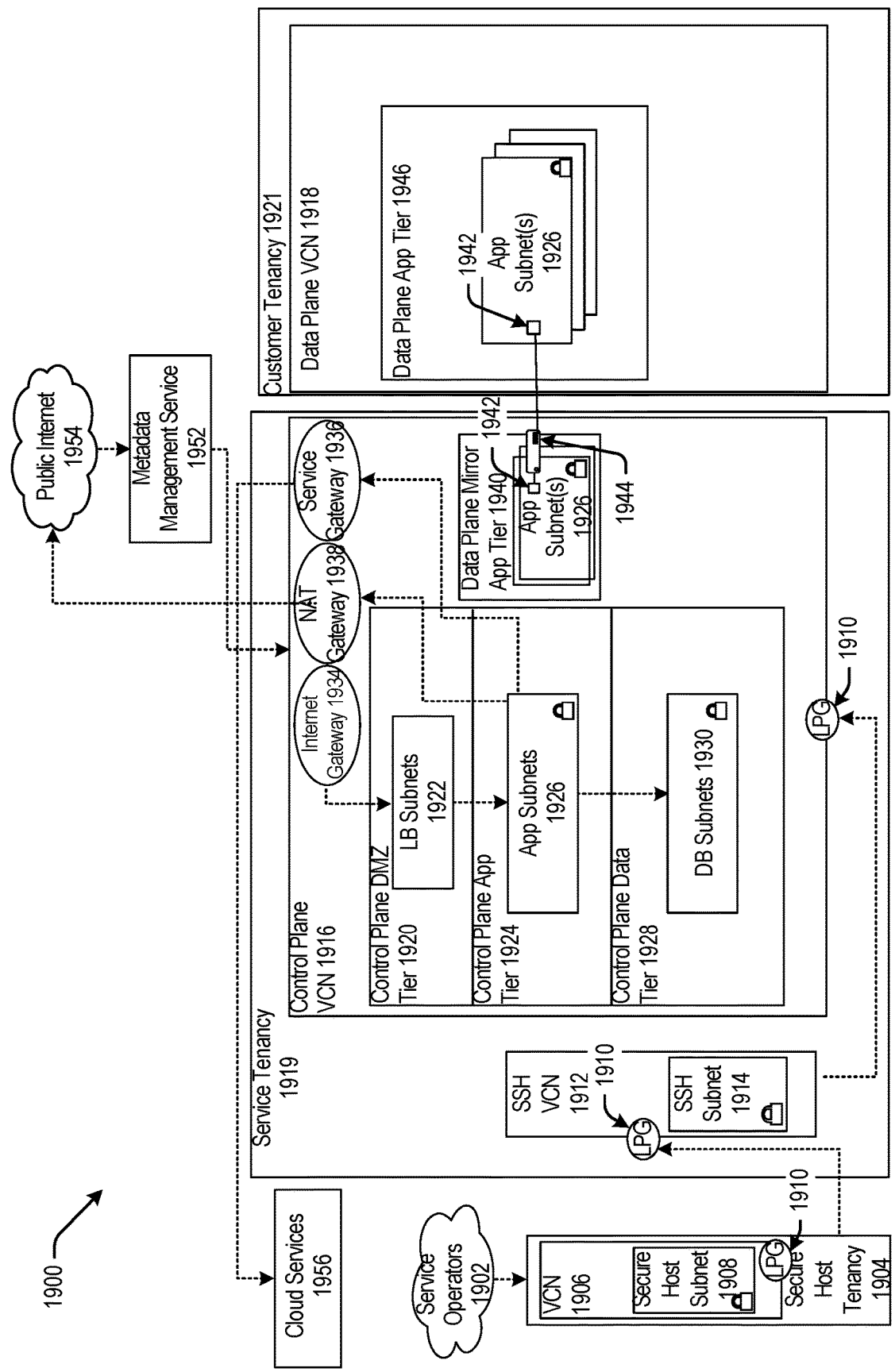
FIG. 19 is a block diagram illustrating another pattern for implementing a cloud infrastructure as a service system, according to at least one embodiment.

FIG. 19 is a block diagram 1900 illustrating another example pattern of an IaaS architecture, according to at least one embodiment. Service operators 1902 (e.g. service operators 1802 of FIG. 18) can be communicatively coupled to a secure host tenancy 1904 (e.g. the secure host tenancy 1804 of FIG. 18) that can include a virtual cloud network (VCN) 1906 (e.g. the VCN 1806 of FIG. 18) and a secure host subnet 1908 (e.g. the secure host subnet 1808 of FIG. 18). The VCN 1906 can include a local peering gateway (LPG) 1910 (e.g. the LPG 1810 of FIG. 18) that can be communicatively coupled to a secure shell (SSH) VCN 1912 (e.g. the SSH VCN 1812 of FIG. 18) via an LPG 1810 contained in the SSH VCN 1912. The SSH VCN 1912 can include an SSH subnet 1914 (e.g. the SSH subnet 1814 of FIG. 18), and the SSH VCN 1912 can be communicatively coupled to a control plane VCN 1916 (e.g. the control plane VCN 1816 of FIG. 18) via an LPG 1910 contained in the control plane VCN 1916. The control plane VCN 1916 can be contained in a service tenancy 1919 (e.g. the service tenancy 1819 of FIG. 18), and the data plane VCN 1918 (e.g. the data plane VCN 1818 of FIG. 18) can be contained in a customer tenancy 1921 that may be owned or operated by users, or customers, of the system.

The control plane VCN 1916 can include a control plane DMZ tier 1920 (e.g. the control plane DMZ tier 1820 of FIG. 18) that can include LB subnet(s) 1922 (e.g. LB subnet(s) 1822 of FIG. 18), a control plane app tier 1924 (e.g. the control plane app tier 1824 of FIG. 18) that can include app subnet(s) 1926 (e.g. app subnet(s) 1826 of FIG. 18), a control plane data tier 1928 (e.g. the control plane data tier 1828 of FIG. 18) that can include database (DB) subnet(s) 1930 (e.g. similar to DB subnet(s) 1830 of FIG. 18). The LB subnet(s) 1922 contained in the control plane DMZ tier 1920 can be communicatively coupled to the app subnet(s) 1926 contained in the control plane app tier 1924 and an Internet gateway 1934 (e.g. the Internet gateway 1834 of FIG. 18) that can be contained in the control plane VCN 1916, and the app subnet(s) 1926 can be communicatively coupled to the DB subnet(s) 1930 contained in the control plane data tier 1928 and a service gateway 1936 (e.g. the service gateway of FIG. 18) and a network address translation (NAT) gateway 1938 (e.g. the NAT gateway 1838 of FIG. 18). The control plane VCN 1916 can include the service gateway 1936 and the NAT gateway 1938.

The control plane VCN 1916 can include a data plane mirror app tier 1940 (e.g. the data plane mirror app tier 1840 of FIG. 18) that can include app subnet(s) 1926. The app subnet(s) 1926 contained in the data plane mirror app tier 1940 can include a virtual network interface controller (VNIC) 1942 (e.g. the VNIC of 1842) that can execute a compute instance 1944 (e.g. similar to the compute instance 1844 of FIG. 18). The compute instance 1944 can facilitate communication between the app subnet(s) 1926 of the data plane mirror app tier 1940 and the app subnet(s) 1926 that can be contained in a data plane app tier 1946 (e.g. the data plane app tier 1846 of FIG. 18) via the VNIC 1942 contained in the data plane mirror app tier 1940 and the VNIC 1942 contained in the data plan app tier 1946.

The Internet gateway 1934 contained in the control plane VCN 1916 can be communicatively coupled to a metadata management service 1952 (e.g. the metadata management service 1852 of FIG. 18) that can be communicatively coupled to public Internet 1954 (e.g. public Internet 1854 of FIG. 18). Public Internet 1954 can be communicatively coupled to the NAT gateway 1938 contained in the control plane VCN 1916. The service gateway 1936 contained in the control plane VCN 1416 can be communicatively couple to cloud services 1956 (e.g. cloud services 1856 of FIG. 18).

In some examples, the data plane VCN 1918 can be contained in the customer tenancy 1921. In this case, the IaaS provider may provide the control plane VCN 1916 for each customer, and the IaaS provider may, for each customer, set up a unique compute instance 1944 that is contained in the service tenancy 1919. Each compute instance 1944 may allow communication between the control plane VCN 1916, contained in the service tenancy 1919, and the data plane VCN 1918 that is contained in the customer tenancy 1921. The compute instance 1944 may allow resources that are provisioned in the control plane VCN 1916 that is contained in the service tenancy 1919, to be deployed or otherwise used in the data plane VCN 1918 that is contained in the customer tenancy 1921.

In other examples, the customer of the IaaS provider may have databases that live in the customer tenancy 1921. In this example, the control plane VCN 1916 can include the data plane mirror app tier 1940 that can include app subnet(s) 1926. The data plane mirror app tier 1940 can reside in the data plane VCN 1918, but the data plane mirror app tier 1940 may not live in the data plane VCN 1918. That is, the data plane mirror app tier 1940 may have access to the customer tenancy 1921, but the data plane mirror app tier 1940 may not exist in the data plane VCN 1918 or be owned or operated by the customer of the IaaS provider. The data plane mirror app tier 1940 may be configured to make calls to the data plane VCN 1918 but may not be configured to make calls to any entity contained in the control plane VCN 1916. The customer may desire to deploy or otherwise use resources in the data plane VCN 1918 that are provisioned in the control plane VCN 1916, and the data plane mirror app tier 1940 can facilitate the desired deployment, or other usage of resources, of the customer.

In some embodiments, the customer of the IaaS provider can apply filters to the data plane VCN 1918. In this embodiment, the customer can determine what the data plane VCN 1918 can access, and the customer may restrict access to public Internet 1954 from the data plane VCN 1918. The IaaS provider may not be able to apply filters or otherwise control access of the data plane VCN 1918 to any outside networks or databases. Applying filters and controls by the customer onto the data plane VCN 1918, contained in the customer tenancy 1921, can help isolate the data plane VCN 1918 from other customers and from public Internet 1954.

In some embodiments, cloud services 1956 can be called by the service gateway 1936 to access services that may not exist on public Internet 1954, on the control plane VCN 1916, or on the data plane VCN 1918. The connection between cloud services 1956 and the control plane VCN 1916 or the data plane VCN 1918 may not be live or continuous. Cloud services 1956 may exist on a different network owned or operated by the IaaS provider. Cloud services 1956 may be configured to receive calls from the service gateway 1936 and may be configured to not receive calls from public Internet 1954. Some cloud services 1956 may be isolated from other cloud services 1956, and the control plane VCN 1916 may be isolated from cloud services 1956 that may not be in the same region as the control plane VCN 1916. For example, the control plane VCN 1916 may be located in "Region 1," and cloud service "Deployment 13," may be located in Region 1 and in "Region 2." If a call to Deployment 13 is made by the service gateway 1936 contained in the control plane VCN 1916 located in Region 1, the call may be transmitted to Deployment 13 in Region 1. In this example, the control plane VCN 1916, or Deployment 13 in Region 1, may not be communicatively coupled to, or otherwise in communication with, Deployment 13 in Region 2.

Figure 20:
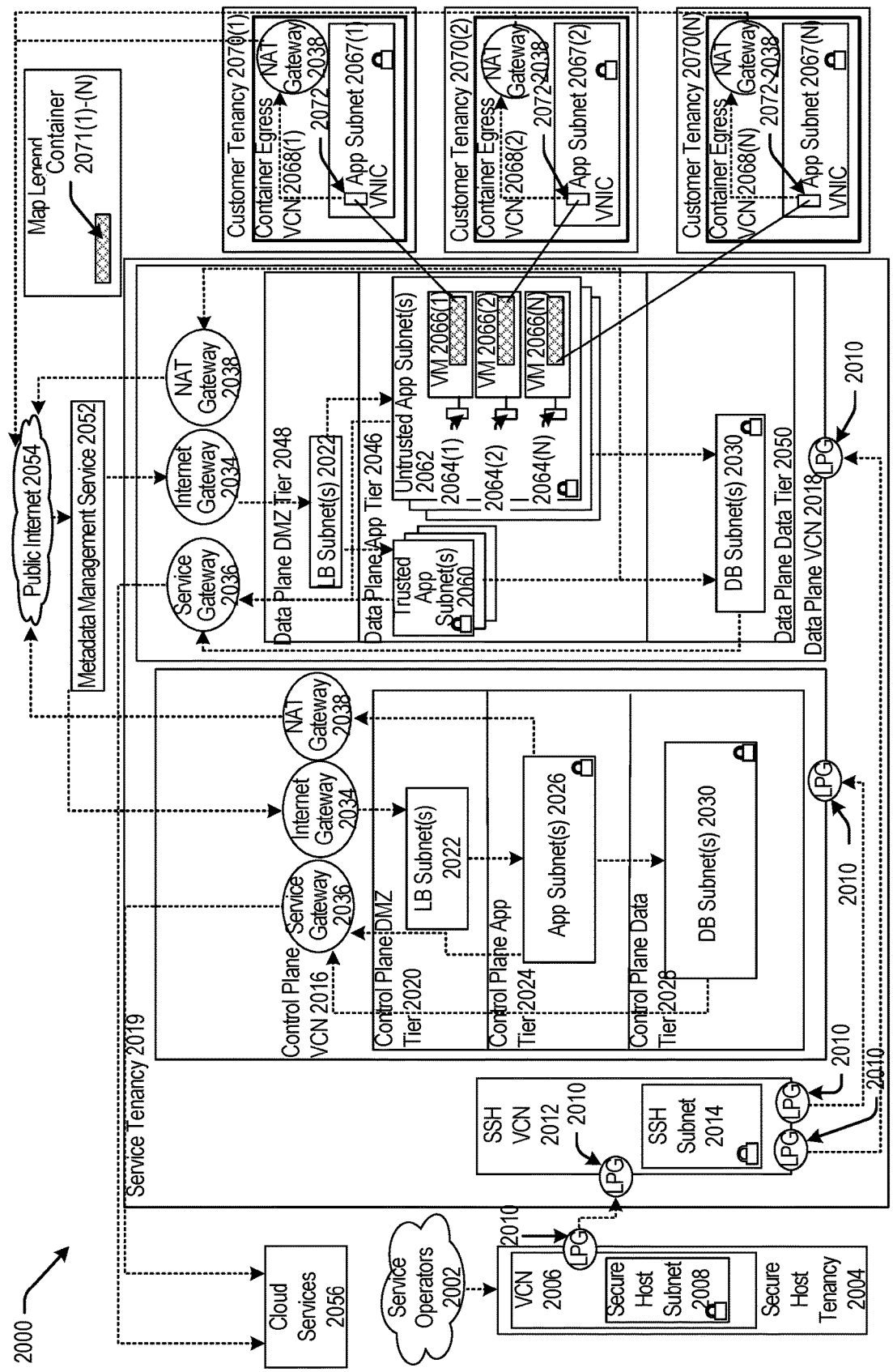
FIG. 20 is a block diagram illustrating another pattern for implementing a cloud infrastructure as a service system, according to at least one embodiment.

FIG. 20 is a block diagram 2000 illustrating another example pattern of an IaaS architecture, according to at least one embodiment. Service operators 2002 (e.g. service operators 1802 of FIG. 18) can be communicatively coupled to a secure host tenancy 2004 (e.g. the secure host tenancy 1804 of FIG. 18) that can include a virtual cloud network (VCN) 2006 (e.g. the VCN 1806 of FIG. 18) and a secure host subnet 2008 (e.g. the secure host subnet 1808 of FIG. 18). The VCN 2006 can include an LPG 2010 (e.g. the LPG 1810 of FIG. 18) that can be communicatively coupled to an SSH VCN 2012 (e.g. the SSH VCN 1812 of FIG. 18) via an LPG 2010 contained in the SSH VCN 2012. The SSH VCN 2012 can include an SSH subnet 2014 (e.g. the SSH subnet 1814 of FIG. 18), and the SSH VCN 1812 can be communicatively coupled to a control plane VCN 2016 (e.g. the control plane VCN 1816 of FIG. 18) via an LPG 2010 contained in the control plane VCN 2016 and to a data plane VCN 2018 (e.g. the data plane 1818 of FIG. 18) via an LPG 2010 contained in the data plane VCN 2018. The control plane VCN 2016 and the data plane VCN 2018 can be contained in a service tenancy 2019 (e.g. the service tenancy 1819 of FIG. 18).

The control plane VCN 1816 can include a control plane DMZ tier 1820 (e.g. the control plane DMZ tier 1820 of FIG. 18) that can include load balancer (LB) subnet(s) 1822 (e.g. LB subnet(s) 1822 of FIG. 18), a control plane app tier 2024 (e.g. the control plane app tier 1824 of FIG. 18) that can include app subnet(s) 2026 (e.g. similar to app subnet(s) 1826 of FIG. 18), a control plane data tier 2028 (e.g. the control plane data tier 1828 of FIG. 18) that can include DB subnet(s) 2030. The LB subnet(s) 2022 contained in the control plane DMZ tier 2020 can be communicatively coupled to the app subnet(s) 2026 contained in the control plane app tier 2024 and to an Internet gateway 1834 (e.g. the Internet gateway 1834 of FIG. 18) that can be contained in the control plane VCN 2016, and the app subnet(s) 2026 can be communicatively coupled to the DB subnet(s) 1830 contained in the control plane data tier 1828 and to a service gateway 1836 (e.g. the service gateway of FIG. 18) and a network address translation (NAT) gateway 1838 (e.g. the NAT gateway 1838 of FIG. 18). The control plane VCN 2016 can include the service gateway 2036 and the NAT gateway 2038.

The data plane VCN 2018 can include a data plane app tier 2046 (e.g. the data plane app tier 1846 of FIG. 18), a data plane DMZ tier 2048 (e.g. the data plane DMZ tier 1848 of FIG. 18), and a data plane data tier 2050 (e.g. the data plane data tier 1850 of FIG. 18). The data plane DMZ tier 2048 can include LB subnet(s) 2022 that can be communicatively coupled to trusted app subnet(s) 2060 and untrusted app subnet(s) 2062 of the data plane app tier 2046 and the Internet gateway 2034 contained in the data plane VCN 2018. The trusted app subnet(s) 2060 can be communicatively coupled to the service gateway 2036 contained in the data plane VCN 2018, the NAT gateway 2038 contained in the data plane VCN 2018, and DB subnet(s) 2030 contained in the data plane data tier 2050. The untrusted app subnet(s) 2062 can be communicatively coupled to the service gateway 2036 contained in the data plane VCN 2018 and DB subnet(s) 2030 contained in the data plane data tier 2050. The data plane data tier 2050 can include DB subnet(s) 2030 that can be communicatively coupled to the service gateway 2036 contained in the data plane VCN 2018.

The untrusted app subnet(s) 2062 can include one or more primary VNICs 2064(1)-(N) that can be communicatively coupled to tenant virtual machines (VMs) 2066(1)-(N). Each tenant VM 2066(1)-(N) can be communicatively coupled to a respective app subnet 2067(1)-(N) that can be contained in respective container egress VCNs 2068(1)-(N) that can be contained in respective customer tenancies 2070(1)-(N). Respective secondary VNICs 2072(1)-(N) can facilitate communication between the untrusted app subnet(s) 2062 contained in the data plane VCN 2018 and the app subnet contained in the container egress VCNs 2068(1)-(N). Each container egress VCNs 2068(1)-(N) can include a NAT gateway 2038 that can be communicatively coupled to public Internet 2054 (e.g. public Internet 1854 of FIG. 18).

The Internet gateway 2034 contained in the control plane VCN 2016 and contained in the data plane VCN 2018 can be communicatively coupled to a metadata management service 2052 (e.g. the metadata management system 1852 of FIG. 18) that can be communicatively coupled to public Internet 2054. Public Internet 2054 can be communicatively coupled to the NAT gateway 2038 contained in the control plane VCN 2016 and contained in the data plane VCN 2018. The service gateway 2036 contained in the control plane VCN 2016 and contained in the data plane VCN 2018 can be communicatively couple to cloud services 2056.

In some embodiments, the data plane VCN 2018 can be integrated with customer tenancies 2070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 2046. Code to run the function may be executed in the VMs 2066(1)-(N), and the code may not be configured to run anywhere else on the data plane VCN 2018. Each VM 2066(1)-(N) may be connected to one customer tenancy 2070. Respective containers 2071(1)-(N) contained in the VMs 2066(1)-(N) may be configured to run the code. In this case, there can be a dual isolation (e.g., the containers 2071(1)-(N) running code, where the containers 2071(1)-(N) may be contained in at least the VM 2066(1)-(N) that are contained in the untrusted app subnet(s) 2062), which may help prevent incorrect or otherwise undesirable code from damaging the network of the IaaS provider or from damaging a network of a different customer. The containers 2071(1)-(N) may be communicatively coupled to the customer tenancy 2070 and may be configured to transmit or receive data from the customer tenancy 2070. The containers 2071(1)-(N) may not be configured to transmit or receive data from any other entity in the data plane VCN 2018. Upon completion of running the code, the IaaS provider may kill or otherwise dispose of the containers 2071(1)-(N).

In some embodiments, the trusted app subnet(s) 2060 may run code that may be owned or operated by the IaaS provider. In this embodiment, the trusted app subnet(s) 2060 may be communicatively coupled to the DB subnet(s) 2030 and be configured to execute CRUD operations in the DB subnet(s) 2030. The untrusted app subnet(s) 2062 may be communicatively coupled to the DB subnet(s) 2030, but in this embodiment, the untrusted app subnet(s) may be configured to execute read operations in the DB subnet(s) 2030. The containers 2071(1)-(N) that can be contained in the VM 2066(1)-(N) of each customer and that may run code from the customer may not be communicatively coupled with the DB subnet(s) 2030.

In other embodiments, the control plane VCN 2016 and the data plane VCN 2018 may not be directly communicatively coupled. In this embodiment, there may be no direct communication between the control plane VCN 2016 and the data plane VCN 2018. However, communication can occur indirectly through at least one method. An LPG 2010 may be established by the IaaS provider that can facilitate communication between the control plane VCN 2016 and the data plane VCN 2018. In another example, the control plane VCN 2016 or the data plane VCN 2018 can make a call to cloud services 2056 via the service gateway 2036. For example, a call to cloud services 2056 from the control plane VCN 2016 can include a request for a service that can communicate with the data plane VCN 2018.

Figure 21:
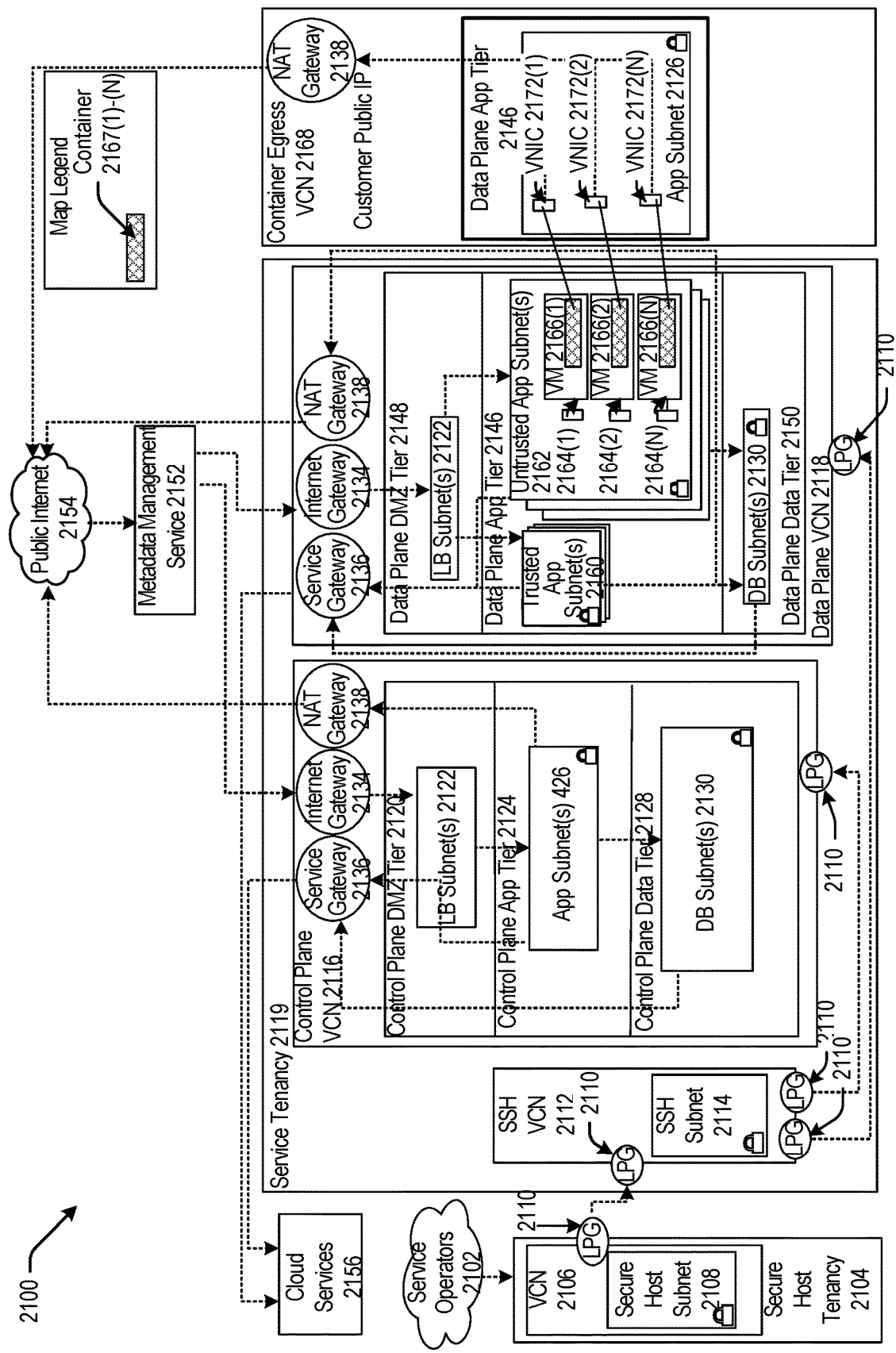
FIG. 21 is a block diagram illustrating another pattern for implementing a cloud infrastructure as a service system, according to at least one embodiment.

FIG. 21 is a block diagram 2100 illustrating another example pattern of an IaaS architecture, according to at least one embodiment. Service operators 2102 (e.g. service operators 1802 of FIG. 18) can be communicatively coupled to a secure host tenancy 2104 (e.g. the secure host tenancy 1804 of FIG. 18) that can include a virtual cloud network (VCN) 2106 (e.g. the VCN 1806 of FIG. 18) and a secure host subnet 2108 (e.g. the secure host subnet 1808 of FIG. 18). The VCN 2106 can include an LPG 2110 (e.g. the LPG 1810 of FIG. 18) that can be communicatively coupled to an SSH VCN 2112 (e.g. the SSH VCN 1812 of FIG. 18) via an LPG 2110 contained in the SSH VCN 2112. The SSH VCN 2112 can include an SSH subnet 2114 (e.g. the SSH subnet 1814 of FIG. 18), and the SSH VCN 2112 can be communicatively coupled to a control plane VCN 2116 (e.g. the control plane VCN 1816 of FIG. 18) via an LPG 2110 contained in the control plane VCN 2116 and to a data plane VCN 2118 (e.g. the data plane 1818 of FIG. 18) via an LPG 2110 contained in the data plane VCN 2118. The control plane VCN 2116 and the data plane VCN 2118 can be contained in a service tenancy 2119 (e.g. the service tenancy 1819 of FIG. 18).

The control plane VCN 2116 can include a control plane DMZ tier 2120 (e.g. the control plane DMZ tier 1820 of FIG. 18) that can include LB subnet(s) 2122 (e.g. LB subnet(s) 1822 of FIG. 18), a control plane app tier 2124 (e.g. the control plane app tier 1824 of FIG. 18) that can include app subnet(s) 2126 (e.g. app subnet(s) 1826 of FIG. 18), a control plane data tier 2128 (e.g. the control plane data tier 1828 of FIG. 18) that can include DB subnet(s) 2130 (e.g. DB subnet(s) 2030 of FIG. 20). The LB subnet(s) 2122 contained in the control plane DMZ tier 2120 can be communicatively coupled to the app subnet(s) 2126 contained in the control plane app tier 2124 and to an Internet gateway 2134 (e.g. the Internet gateway 1834 of FIG. 18) that can be contained in the control plane VCN 2116, and the app subnet(s) 2126 can be communicatively coupled to the DB subnet(s) 2130 contained in the control plane data tier 2128 and to a service gateway 2136 (e.g. the service gateway of FIG. 18) and a network address translation (NAT) gateway 2138 (e.g. the NAT gateway 1838 of FIG. 18). The control plane VCN 2116 can include the service gateway 2136 and the NAT gateway 2138.

The data plane VCN 2118 can include a data plane app tier 2146 (e.g. the data plane app tier 1846 of FIG. 18), a data plane DMZ tier 2148 (e.g. the data plane DMZ tier 2148 of FIG. 18), and a data plane data tier 2150 (e.g. the data plane data tier 1850 of FIG. 18). The data plane DMZ tier 2148 can include LB subnet(s) 2122 that can be communicatively coupled to trusted app subnet(s) 2160 (e.g. trusted app subnet(s) 2060 of FIG. 20) and untrusted app subnet(s) 2162 (e.g. untrusted app subnet(s) 2062 of FIG. 20) of the data plane app tier 2146 and the Internet gateway 2134 contained in the data plane VCN 2118. The trusted app subnet(s) 2160 can be communicatively coupled to the service gateway 2136 contained in the data plane VCN 2118, the NAT gateway 2138 contained in the data plane VCN 2118, and DB subnet(s) 2130 contained in the data plane data tier 2150. The untrusted app subnet(s) 2162 can be communicatively coupled to the service gateway 2136 contained in the data plane VCN 2118 and DB subnet(s) 2130 contained in the data plane data tier 2150. The data plane data tier 2150 can include DB subnet(s) 2130 that can be communicatively coupled to the service gateway 2136 contained in the data plane VCN 2118.

The untrusted app subnet(s) 2162 can include primary VNICs 2164(1)-(N) that can be communicatively coupled to tenant virtual machines (VMs) 2166(1)-(N) residing within the untrusted app subnet(s) 2162. Each tenant VM 2166(1)-(N) can run code in a respective container 2167(1)-(N), and be communicatively coupled to an app subnet 2126 that can be contained in a data plane app tier 2146 that can be contained in a container egress VCN 2168. Respective secondary VNICs 2172(1)-(N) can facilitate communication between the untrusted app subnet(s) 2162 contained in the data plane VCN 2118 and the app subnet contained in the container egress VCN 2168. The container egress VCN can include a NAT gateway 2138 that can be communicatively coupled to public Internet 2154 (e.g. public Internet 1854 of FIG. 18).

The Internet gateway 2134 contained in the control plane VCN 2116 and contained in the data plane VCN 2118 can be communicatively coupled to a metadata management service 2152 (e.g. the metadata management system 1852 of FIG. 18) that can be communicatively coupled to public Internet 2154. Public Internet 2154 can be communicatively coupled to the NAT gateway 2138 contained in the control plane VCN 2116 and contained in the data plane VCN 2118. The service gateway 2136 contained in the control plane VCN 2116 and contained in the data plane VCN 2118 can be communicatively couple to cloud services 2156.

In some examples, the pattern illustrated by the architecture of block diagram 2100 of FIG. 21 may be considered an exception to the pattern illustrated by the architecture of block diagram 2000 of FIG. 20 and may be desirable for a customer of the IaaS provider if the IaaS provider cannot directly communicate with the customer (e.g., a disconnected region). The respective containers 2167(1)-(N) that are contained in the VMs 2166(1)-(N) for each customer can be accessed in real-time by the customer. The containers 2167(1)-(N) may be configured to make calls to respective secondary VNICs 2172(1)-(N) contained in app subnet(s) 2126 of the data plane app tier 2146 that can be contained in the container egress VCN 2168. The secondary VNICs 2172(1)-(N) can transmit the calls to the NAT gateway 2138 that may transmit the calls to public Internet 2154. In this example, the containers 2167(1)-(N) that can be accessed in real-time by the customer can be isolated from the control plane VCN 2116 and can be isolated from other entities contained in the data plane VCN 2118. The containers 2167(1)-(N) may also be isolated from resources from other customers.

In other examples, the customer can use the containers 2167(1)-(N) to call cloud services 2156. In this example, the customer may run code in the containers 2167(1)-(N) that requests a service from cloud services 2156. The containers 2167(1)-(N) can transmit this request to the secondary VNICs 2172(1)-(N) that can transmit the request to the NAT gateway that can transmit the request to public Internet 2154. Public Internet 2154 can transmit the request to LB subnet(s) 2122 contained in the control plane VCN 2116 via the Internet gateway 2134. In response to determining the request is valid, the LB subnet(s) can transmit the request to app subnet(s) 2126 that can transmit the request to cloud services 2156 via the service gateway 2136.

It should be appreciated that IaaS architectures 1800, 1900, 2000, 2100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 22:
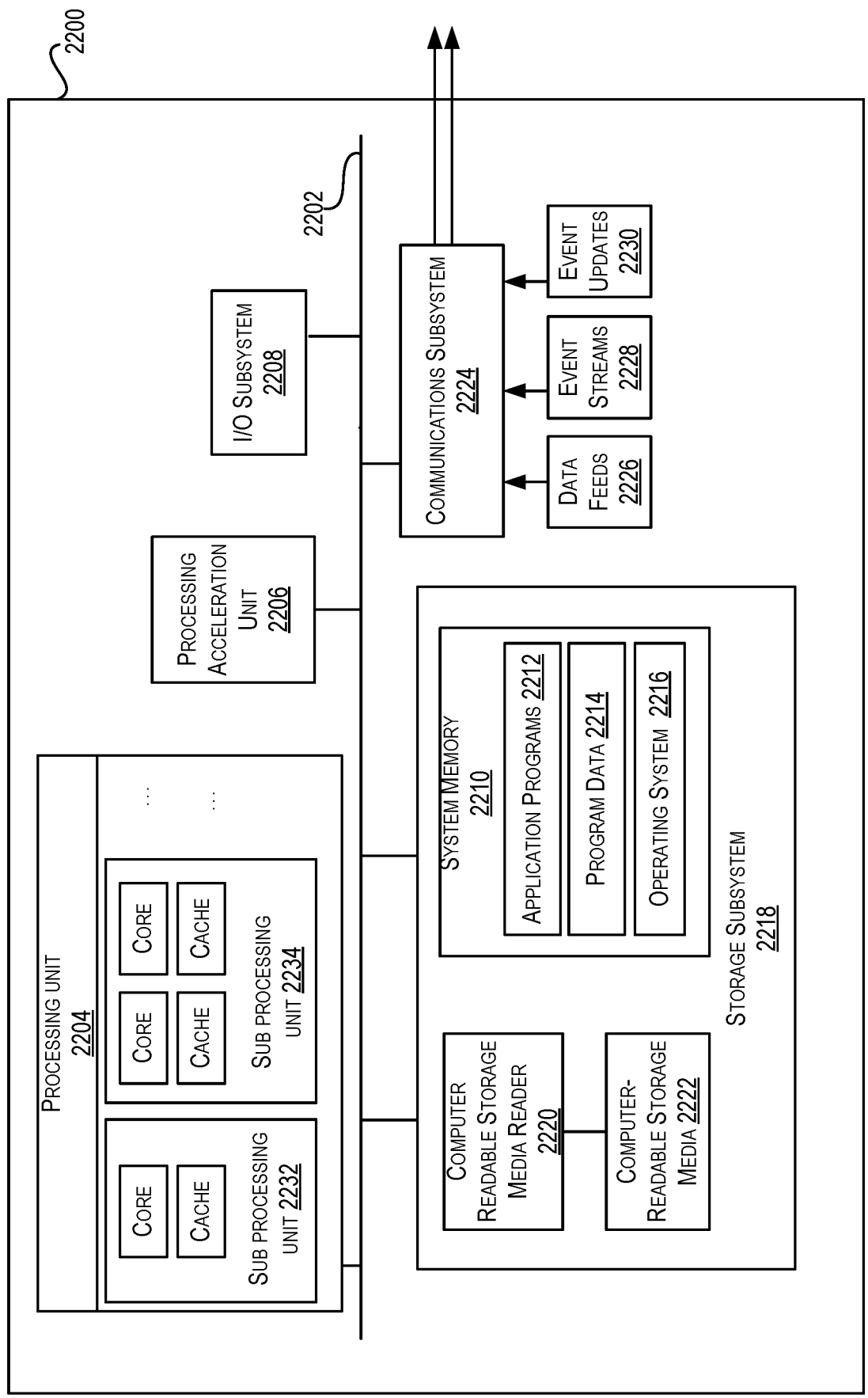
FIG. 22 is a block diagram illustrating an example computer system, according to at least one embodiment.

FIG. 22 illustrates an example computer system 2200, in which various embodiments of the present disclosure may be implemented. The system 2200 may be used to implement any of the computer systems described above. As shown in the figure, computer system 2200 includes a processing unit 2204 that communicates with a number of peripheral subsystems via a bus subsystem 2202. These peripheral subsystems may include a processing acceleration unit 2206, an I/O subsystem 2208, a storage subsystem 2218 and a communications subsystem 2224. Storage subsystem 2218 includes tangible computer-readable storage media 2222 and a system memory 2210.

Bus subsystem 2202 provides a mechanism for letting the various components and subsystems of computer system 2200 communicate with each other as intended. Although bus subsystem 2202 is shown schematically as a single bus, alternative embodiments of the bus subsystem may utilize multiple buses. Bus subsystem 2202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2204, which can be implemented as one or more integrated circuits (e.g., a conventional microprocessor or microcontroller), controls the operation of computer system 2200. One or more processors may be included in processing unit 2204. These processors may include single core or multicore processors. In certain embodiments, processing unit 2204 may be implemented as one or more independent processing units 2232 and/or 2234 with single or multicore processors included in each processing unit. In other embodiments, processing unit 2204 may also be implemented as a quad-core processing unit formed by integrating two dual-core processors into a single chip.

In various embodiments, processing unit 2204 can execute a variety of programs in response to program code and can maintain multiple concurrently executing programs or processes. At any given time, some or all of the program code to be executed can be resident in processor(s) 2204 and/or in storage subsystem 2218. Through suitable programming, processor(s) 2204 can provide various functionalities described above. Computer system 2200 may additionally include a processing acceleration unit 2206, which can include a digital signal processor (DSP), a special-purpose processor, and/or the like.

I/O subsystem 2208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2200 may comprise a storage subsystem 2218 that comprises software elements, shown as being currently located within a system memory 2210. System memory 2210 may store program instructions that are loadable and executable on processing unit 2204, as well as data generated during the execution of these programs.

Depending on the configuration and type of computer system 2200, system memory 2210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2204. In some implementations, system memory 2210 may include multiple different types of memory, such as static random access memory (SRAM) or dynamic random access memory (DRAM). In some implementations, a basic input/output system (BIOS), containing the basic routines that help to transfer information between elements within computer system 2200, such as during start-up, may typically be stored in the ROM. By way of example, and not limitation, system memory 2210 also illustrates application programs 2212, which may include client applications, Web browsers, mid-tier applications, relational database management systems (RDBMS), etc., program data 2214, and an operating system 2216. By way of example, operating system 2216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 17 OS, and Palm® OS operating systems.

Storage subsystem 2218 may also provide a tangible computer-readable storage medium for storing the basic programming and data constructs that provide the functionality of some embodiments. Software (programs, code modules, instructions) that when executed by a processor provide the functionality described above may be stored in storage subsystem 2218. These software modules or instructions may be executed by processing unit 2204. Storage subsystem 2218 may also provide a repository for storing data used in accordance with the present disclosure.

Storage subsystem 2200 may also include a computer-readable storage media reader 2220 that can further be connected to computer-readable storage media 2222. Together and, optionally, in combination with system memory 2210, computer-readable storage media 2222 may comprehensively represent remote, local, fixed, and/or removable storage devices plus storage media for temporarily and/or more permanently containing, storing, transmitting, and retrieving computer-readable information.

Computer-readable storage media 2222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2200.

By way of example, computer-readable storage media 2222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2222 may include, but is not limited to, Zip® drives, flash memory cards, universal serial bus (USB) flash drives, secure digital (SD) cards, DVD disks, digital video tape, and the like. Computer-readable storage media 2222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2200.

Communications subsystem 2224 provides an interface to other computer systems and networks. Communications subsystem 2224 serves as an interface for receiving data from and transmitting data to other systems from computer system 2200. For example, communications subsystem 2224 may enable computer system 2200 to connect to one or more devices via the Internet. In some embodiments communications subsystem 2224 can include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof), global positioning system (GPS) receiver components, and/or other components. In some embodiments communications subsystem 2224 can provide wired network connectivity (e.g., Ethernet) in addition to or instead of a wireless interface.

In some embodiments, communications subsystem 2224 may also receive input communication in the form of structured and/or unstructured data feeds 2226, event streams 2228, event updates 2230, and the like on behalf of one or more users who may use computer system 2200.

By way of example, communications subsystem 2224 may be configured to receive data feeds 2226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2224 may also be configured to receive data in the form of continuous data streams, which may include event streams 2228 of real-time events and/or event updates 2230 that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2224 may also be configured to output the structured and/or unstructured data feeds 2226, event streams 2228, event updates 2230, and the like to one or more databases that may be in communication with one or more streaming data source computers coupled to computer system 2200.

Computer system 2200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein. In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

The invention claimed is:

1. A method comprising:
communicatively coupling a first physical port of a network virtualization device (NVD) included in a datacenter to a first top-of-rack (TOR) switch and a second TOR switch;
communicatively coupling a second physical port of the NVD with a network interface card (NIC) associated with a host machine, the second physical port providing a first logical port and a second logical port for communications between the NVD and the NIC;
receiving, by the NVD, a packet from the host machine via the first logical port or the second logical port;
determining, by the NVD, a particular TOR, from a group including the first TOR and the second TOR, for communicating the packet; and
transmitting, by the NVD, the packet to the particular TOR to facilitate communication of the packet to a destination host machine.

2. The method of claim 1, wherein the packet originates from a virtual machine executing on the host machine, the method further comprising:
determining, based on a configuration of the NVD, a particular logical port from the first logical port or the second logical port, that is to be used for communicating the packet from the host machine to the NVD; and
transmitting the packet from the host machine to the NVD using the particular logical port.

3. The method of claim 1, wherein the first physical port of the NVD is associated with a first IP address, a second IP address, a first MAC address, and a second MAC address.

4. The method of claim 1, wherein the second physical port of the NVD is associated with a first overlay IP address, a second overlay IP address, a first overlay MAC address, and a second overlay MAC address.

5. The method of claim 1, wherein the destination host machine is a remote host machine included in a customer on-premises network.

6. The method of claim 2, wherein the host machine includes a plurality of virtual machines, each of which is associated with a logical interface, and wherein the packet originating from the virtual machine is transmitted to the NVD via the logical interface associated with the virtual machine.

7. The method of claim 1, wherein upon receiving the packet from the host machine, the method further comprising:
obtaining IP address of a remote NVD that serves the destination host machine; and
modifying a header of the packet to include the IP address of the remote NVD as an intended destination of the packet and a software interface IP address of the NVD as being a source of the packet.

8. The method of claim 1, further comprising:
executing by the NVD, a flow hashing operation to select one of the first TOR and the second TOR for communicating the packet to the destination host machine.

9. A computing device comprising:
a processor; and
a memory including instructions that, when executed with the processor, cause the computing device to, at least:
communicatively couple a first physical port of a network virtualization device (NVD) included in a datacenter to a first top-of-rack (TOR) switch and a second TOR switch;
communicatively couple a second physical port of the NVD with a network interface card (NIC) associated with a host machine, the second physical port providing a first logical port and a second logical port for communications between the NVD and the NIC;
receive, by the NVD, a packet from the host machine via the first logical port or the second logical port;
determine, by the NVD, a particular TOR, from a group including the first TOR and the second TOR, for communicating the packet; and
transmit, by the NVD, the packet to the particular TOR to facilitate communication of the packet to a destination host machine.

10. The computing device of claim 9, wherein the packet originates from a virtual machine executing on the host machine, and wherein the computing device is further configured to:
determine, based on a configuration of the NVD, a particular logical port from the first logical port or the second logical port, that is to be used for communicating the packet from the host machine to the NVD; and
transmit the packet from the host machine to the NVD using the particular logical port.

11. The computing device of claim 9, wherein the first physical port of the NVD is associated with a first IP address, a second IP address, a first MAC address, and a second MAC address.

12. The computing device of claim 9, wherein the second physical port of the NVD is associated with a first overlay IP address, a second overlay IP address, a first overlay MAC address, and a second overlay MAC address.

13. The computing device of claim 9, wherein the destination host machine is a remote host machine included in a customer on-premises network.

14. The computing device of claim 10, wherein the host machine includes a plurality of virtual machines, each of which is associated with a logical interface, and wherein the packet originating from the virtual machine is transmitted to the NVD via the logical interface associated with the virtual machine.

15. The computing device of claim 9, wherein upon receiving the packet from the host machine, the computing device is further configured to:
obtain IP address of a remote NVD that serves the destination host machine; and
modify a header of the packet to include the IP address of the remote NVD as an intended destination of the packet and a software interface IP address of the NVD as being a source of the packet.

16. The computing device of claim 9, wherein the computing device is further configured to:
  execute by the NVD, a flow hashing operation to select one of the first TOR and the second TOR for communicating the packet to the destination host machine.

17. A non-transitory computer readable medium storing specific computer-executable instructions that, when executed by a processor, cause a computer system to perform operations comprising:
  communicatively coupling a first physical port of a network virtualization device (NVD) included in a datacenter to a first top-of-rack (TOR) switch and a second TOR switch;
  communicatively coupling a second physical port of the NVD with a network interface card (NIC) associated with a host machine, the second physical port providing a first logical port and a second logical port for communications between the NVD and the NIC;
  receiving, by the NVD, a packet from the host machine via the first logical port or the second logical port;
  determining, by the NVD, a particular TOR, from a group including the first TOR and the second TOR, for communicating the packet; and
  transmitting, by the NVD, the packet to the particular TOR to facilitate communication of the packet to a destination host machine.

18. The non-transitory computer readable medium of claim 17, wherein the packet originates from a virtual machine executing on the host machine, the computer system further configured for:
  determining, based on a configuration of the NVD, a particular logical port from the first logical port or the second logical port, that is to be used for communicating the packet from the host machine to the NVD; and
  transmitting the packet from the host machine to the NVD using the particular logical port.

19. The non-transitory computer readable medium of claim 17, wherein the first physical port of the NVD is associated with a first IP address, a second IP address, a first MAC address, and a second MAC address.

20. The non-transitory computer readable medium of claim 17, wherein the second physical port of the NVD is associated with a first overlay IP address, a second overlay IP address, a first overlay MAC address, and a second overlay MAC address.

* * * * *

UNITED STATES PATENT AND TRADEMARK OFFICE
CERTIFICATE OF CORRECTION

PATENT NO. : 12,086,625 B2  
APPLICATION NO. : 18/360660  
DATED : September 10, 2024  
INVENTOR(S) : Brar et al.

Page 1 of 1

It is certified that error appears in the above-identified patent and that said Letters Patent is hereby corrected as shown below:

In the Drawings

On sheet 2 of 23, in FIG. 2 and on the title page, the illustrative print figure, under reference numeral 268, Line 2, delete "INTANCE" and insert -- INSTANCE --, therefor.

On sheet 2 of 23, in FIG. 2 and on the title page, the illustrative print figure, under reference numeral 274, Line 2, delete "INTANCE" and insert -- INSTANCE --, therefor.

In the Specification

In Column 5, Lines 33-34, delete "(VXLAN IETF" and insert -- (VXLAN-IETF --, therefor.

In Column 10, Line 65, delete "TP" and insert -- IP --, therefor.

In Column 16, Line 63, delete "and or" and insert -- and/or --, therefor.

Signed and Sealed this
Twenty-eighth Day of January, 2025

Coke Morgan Stewart
*Acting Director of the United States Patent and Trademark Office*